(12) United States Patent
Hara et al.

(10) Patent No.: US 6,970,473 B1
(45) Date of Patent: Nov. 29, 2005

(54) COMMUNICATION METHOD AND COMMUNICATION APPARATUS

(75) Inventors: Kazuhiro Hara, Kanagawa (JP); Noboru Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/506,650

(22) Filed: Feb. 17, 2000

(30) Foreign Application Priority Data

Feb. 18, 1999 (JP) ............................... P11-040336
Feb. 19, 1999 (JP) ............................... P11-042349

(51) Int. Cl.[7] ........................................... H04L 12/28
(52) U.S. Cl. ..................................... 370/401; 370/316
(58) Field of Search ................................ 370/310, 315, 370/316, 326, 401, 389, 390, 432, 323

(56) References Cited

U.S. PATENT DOCUMENTS 5,903,559 A * 5/1999 Acharya et al. ............ 370/355
6,160,797 A * 12/2000 Robert et al. ............... 370/316
6,385,647 B1 * 5/2002 Willis et al. ................ 709/217
6,501,423 B2 * 12/2002 Kelly et al. ................. 342/359
6,522,865 B1 * 2/2003 Otten .......................... 455/13.1

* cited by examiner

Primary Examiner—Man U. Phan
Assistant Examiner—Thien Tran
(74) Attorney, Agent, or Firm—Bell, Boyd & Lloyd LLC

(57) ABSTRACT

To allow bi-directional communication by using a bridge type feed and to reduce a load on equipment such as a receiver connected to a UDL network, a communication apparatus for carrying out communication on the Internet using an uni-directional communication line comprises an interface (5b) for receiving IP datagram to be transmitted to the communication line at the side for transmitting data to the communication line, and an interface (12) for realizing a virtual communication route from the receiving side to the transmitting side on the communication line, for carrying out bi-directional communication as UDLR. Moreover, the apparatus determines a destination of a packet inputted to the feed through a predetermined interface, then determines which network the packet should be transferred to in accordance with the determined destination of the packet, and then transfers the packet through a predetermined interface only when transfer is necessary.

4 Claims, 22 Drawing Sheets

| | 138 | 125 | 126 |
|---|---|---|---|
| | Invalid | 00:00:f8:1f:de:45 | Fri Aug 7 23:31:02 1998 |
| Fixed Length | Valid | 08:00:46:01:00:09 | Wed Sep 9 15:00:23 1998 |
| | Valid | 00:90:27:0c:46:98 | Fei Feb 12 16:25:57 1999 |
| | Invalid | (Unoccupied) | (Unoccupied) |

137

COMMUNICATION METHOD AND COMMUNICATION APPARATUS

BACKGROUND OF THE INVENTION

1. Field of the Invention

The invention relates to a communication method for carrying out Internet communication using a uni-directional communication line such as a satellite line and a communication apparatus to be applied to the communication method.

2. Description of the Related Art

Communication equipment (a transmitter) for transferring IP datagram flowing through a certain communication line to a uni-directional communication line such as a satellite line is called a feed. During transfer, the feed performs media conversion (encoding) for feeding data coming through a certain communication line through the uni-directional communication line. The feed is considered to be implemented as a router or a bridge. Some feeds functioning as a router implement UDLR (Uni-Directional Link Routing), which is a technique for using the uni-directional communication line as a bi-directional communication line in the form of a dummy (for UDLR, see Internet-Draft: draft-ietf-udlr-lltunnel-01.txt).

FIG. 1 shows the feed functioning as a router. In this case, a feed 1a selectively encodes the IP datagram flowing through a bi-directional communication line 3 in accordance with a destination address of the IP datagram and transfers the IP datagram to a uni-directional communication line 2. In this case, the feed 1a has two interfaces: an interface 4a to the uni-directional communication line 2 and an interface 5a to the bi-directional communication line 3. The two interfaces belong to different networks.

On the other hand, FIG. 2 shows the feed functioning as a bridge. In this case, a section for performing a function of the router is eliminated from the feed and this function is left to a general-purpose router 6, whereby a feed 1b can be used as an apparatus for encoding. In this case, the feed 1b has two interfaces: an interface 4b to the uni-directional communication line and an interface 5b to the router 6. The two interfaces belong to the same network.

Moreover, FIG. 3 shows another constitution of a bridge type feed supporting bi-directional communication as UDLR. A feed 101 has at least three network interfaces. It is now assumed that the interfaces are referred to as local I/F 102, UDL I/F 103 and tunnel I/F 104. The local I/F 102 is a bi-directional network interface. The network, which this I/F is connected to, is referred to as local network 105. The UDL I/F 103 is a uni-directional network interface for transmission only. The network, which this I/F is connected to, is referred to as UDL network 106. The tunnel I/F 104 is a bi-directional network interface. The network, which this I/F is connected to, is referred to as tunnel network 107. The local network 105 and the UDL network 106 have the same network address 108. The tunnel network 107 has a different network address 109 from the local network 105 and the UDL network 106.

A main function of the feed 101 is to receive all of packets flowing through the local network 105 (S201) and transfer these packets to the UDL network 106 through the UDL I/F 103 (S202), as shown in a flow chart of FIG. 4. This function is referred to as packet transfer function 110.

Another function of the feed 101 is as follows. In order to realize the bi-directional communication as UDLR, as shown in FIG. 6, this function includes to receive through the tunnel I/F 104 the packet called a GRE packet 111 (see RFC1701) and having another packet 112 encapsulated in the IP datagram (S401); to check whether or not the GRE packet 111 is fragmented (S402); to perform restructure process if the GRE packet 111 is fragmented (s403); to then extract the packet 112 encapsulated in the GRE packet 111 (S404); to make two copies of the extracted packet 112 (s405); and to send out one copy to the local network 105 through the local I/F 102 and send out the other copy to the UDL network 106 through the UDL I/F 103 (s406). This function is referred to as UDLR function 113. FIG. 5 shows the constitution in which the UDLR function 113 is executed.

When the feed is changed from the router to the bridge, the functions of the feed are reduced and thus implementation can be simplified. However, the UDLR, which is a technique for using the uni-directional communication line as the bi-directional communication line in the form of the dummy cannot be realized. This will be described with reference to FIG. 7. It is impossible to make transmission (9a or 9b) of the IP datagram from a router 7a at the receiving side on the uni-directional communication line to a router 8 at the transmitting side on the uni-directional communication line or to a router 7b at the other receiving side on the uni-directional communication line by virtually using the uni-directional communication line backward. The reason will be described below.

To transmit the IP datagram from the router 7a at the receiving side on the uni-directional communication line to the router 8 at the transmitting side on the uni-directional communication line or to the router 7b at the other receiving side on the uni-directional communication line by virtually using the uni-directional communication line backward, the IP datagram to be transmitted is encapsulated in the other IP datagram by using GRE (see RFC1701) and then the IP datagram is transmitted over the bi-directional communication line such as mainly a ground line. As shown in FIG. 8, IP datagram 16 to be transmitted is embedded in new IP datagram 15 as a data portion and then transmitted. However, a destination address 26 of the new IP datagram contains an IP address of the equipment (i.e., the feed) for realizing UDLR at the transmitting side.

In order that the feed receives the encapsulated IP datagram 15, the IP datagram having the IP address of the feed as the destination address 26 must be routed so that the IP datagram may be sent to the feed via the bi-directional communication line such as the ground line. When the feed functions as a router as shown in FIG. 9, the IP address of the interface 5a of the feed 1a to the bi-directional line is set to the destination address, whereby the GRE packet is routed without any problem and reaches to the feed through a route 10a. In this case, the transmission 9a of the IP datagram from the router 7a at the receiving side on the uni-directional communication line to the router 8 at the transmitting side on the uni-directional communication line by virtually using the uni-directional communication line backward is actually made via a route 11a of FIG. 10. The transmission 9b of the IP datagram from the router 7a at the receiving side on the uni-directional communication line to the router 7b at the other receiving side on the uni-directional communication line by virtually using the uni-directional communication line backward is actually made via a route 11b shown in FIG. 11.

However, when the feed functions as a bridge as shown in FIG. 12, the feed 1b is located close to the uni-directional communication line 2 compared to the router 7a at the receiving side on the uni-directional communication line. Thus, the interfaces (4b and 5b) of the feed 1b have the IP address belonging to the network address given to the uni-directional communication line 2. Thus, when the IP datagram is transmitted from the router 7a at the receiving side on the uni-directional communication line toward this IP address, the IP datagram is routed (10b) so that the IP datagram may be transmitted toward the uni-directional communication line 2, not toward the bi-directional communication line 3 such as the ground line. Since this route 10b is not realized due to properties of the uni-directional line, the IP datagram is not transmitted and consequently UDLR cannot be realized.

Next, a problem about connection between the feed and other equipment will be described. FIG. 13 shows one example of the form of the connection between the feed and other equipment. Besides the feed 101, a router 114 and a host 115 are connected to the local network 105. A receiver 117, a receiving apparatus having an interface 116 for reception only is connected to the UDL network 106. A router 118 is connected to the tunnel network 107. The router 118 may be the same router as the router 114. In this case, it is assumed that the local network 105 is connected to the tunnel network 107 through a different interface. In the prior art, as shown in FIG. 14, during the communication between the router 114 and the host 115 via the local network 105, a packet 119 to be transmitted is also transmitted to the UDL network 106 by the packet transfer function 110 of the feed 101. The packet transferred to the UDL network 106 is taken as a packet 120. However, the packet 120 is one which no equipment receives. A flow of such a packet through the UDL network 106 causes a waste of a band of the UDL network 106. Moreover, the equipment such as the receiver 117 connected to the UDL network 106 performs an operation such as rejection of this unnecessary packet 120 by filtering. Consequently, a resource such as CPU is wasted.

Moreover, as shown in FIG. 15, even when the packet 112 encapsulated in the GRE packet 111 received from the tunnel network 107 is addressed to the equipment connected to the local network 105, such as the router 114 and the host 115, the UDLR function 113 of the feed 101 causes the copy of the packet 112 to be transmitted to the UDL network 106. The copy of the packet 112 flowing through the UDL network 106 is taken as a packet 121. The packet 121 is one which no equipment receives, similarly to the packet 120. The flow of such a packet through the UDL network 106 causes the waste of the band of the UDL network 106. Moreover, the equipment such as the receiver 117 connected to the UDL network 106 performs the operation such as the rejection of this unnecessary packet 121 by filtering. As a result, the resource such as CPU is wasted.

It is a first object of the invention to allow the bi-directional communication by using the bridge type feed.

It is a second object of the invention to allow the feed to generate the least possible unnecessary packet such as the above-mentioned packets 120 and 121, to permit an effective use of the band of the UDL network, and to reduce a load on the equipment such as the receiver connected to the UDL network.

SUMMARY OF THE INVENTION

A first embodiment of the invention provides a communication method on the Internet using an uni-directional communication line, which comprises the steps of: setting a route for receiving IP datagram to be transmitted to the communication line at the side for transmitting data to the communication line; and setting another route for realizing a virtual communication route from the receiving side to the transmitting side on the communication line, for carrying out bi-directional communication as UDLR.

According to the first embodiment of the invention, a bridge type feed can realize the bi-directional communication as UDLR.

A second embodiment of the invention provides a communication method for connecting a second communication line capable of bi-directional communication to bridge type transmitting means for transmitting data to a first uni-directional communication line, thereby virtually carrying out the bi-directional communication over the first communication line, which comprises the step of: determining a destination of a packet inputted to the transmitting means through a predetermined interface, then determining which network the packet should be transferred to in accordance with the determined destination of the packet, and then transferring the packet through a predetermined interface only when transfer is necessary.

According to the second embodiment of the invention, the bridge type feed supporting the bi-directional communication such as UDLR can reduce the number of times an unnecessary packet is transferred to the uni-directional communication line. The unnecessary packet means the packet which does not require to be transferred to the uni-directional communication line, among the packets flowing through a bi-directional communication line connected to the feed.

BRIEF DESCRIPTION OF THE DRAWINGS

FIG. 16 is a block diagram of the example of the constitution according to the first embodiment of the invention;

DETAILED DESCRIPTION OF THE PREFERRED EMBODIMENT

Figure 1:
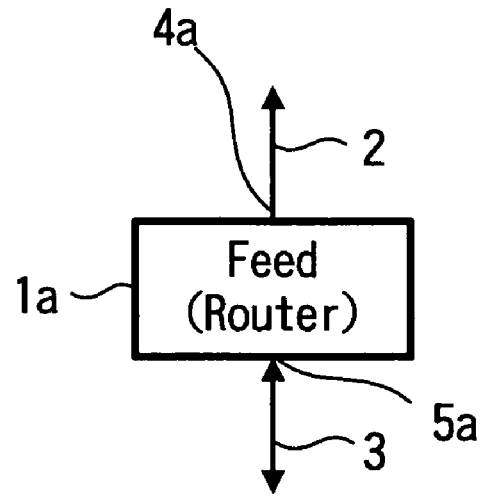
FIG. 1 is a block diagram of the example of the constitution of the feed functioning as the router of the prior art.
Figure 2:
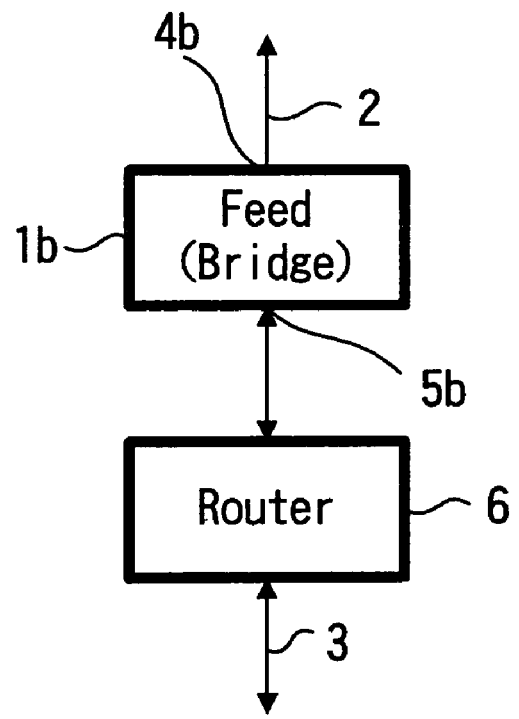
FIG. 2 is a block diagram of the example of the constitution of the feed functioning as the bridge of the prior art.
Figure 3:
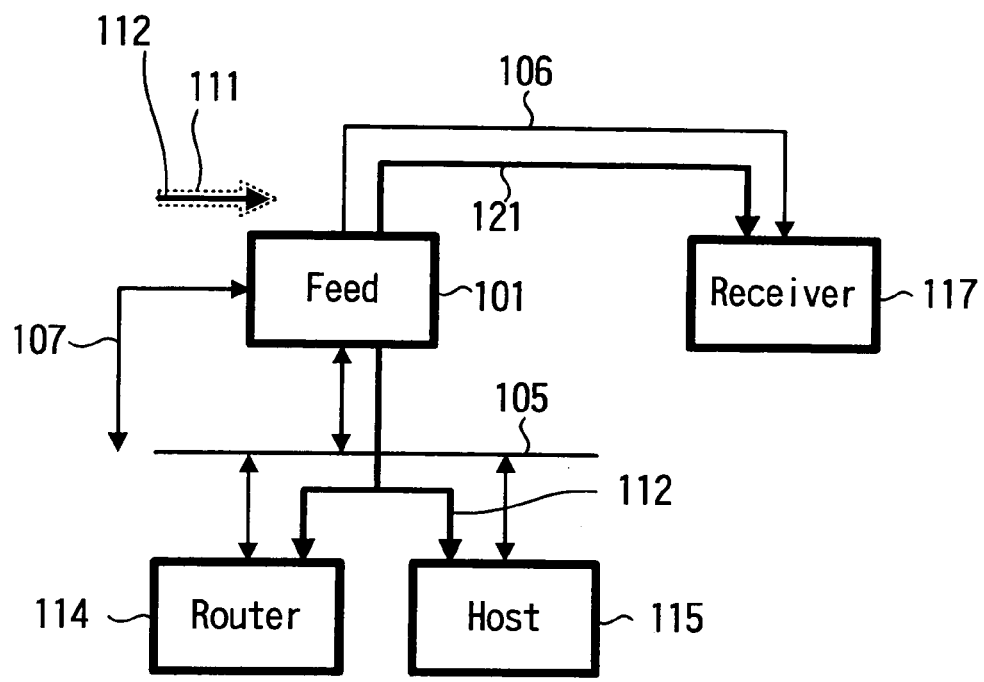
FIG. 3 is a block diagram of the example of the constitution for carrying out bi-directional communication using UDLR of the prior art.
Figure 4:
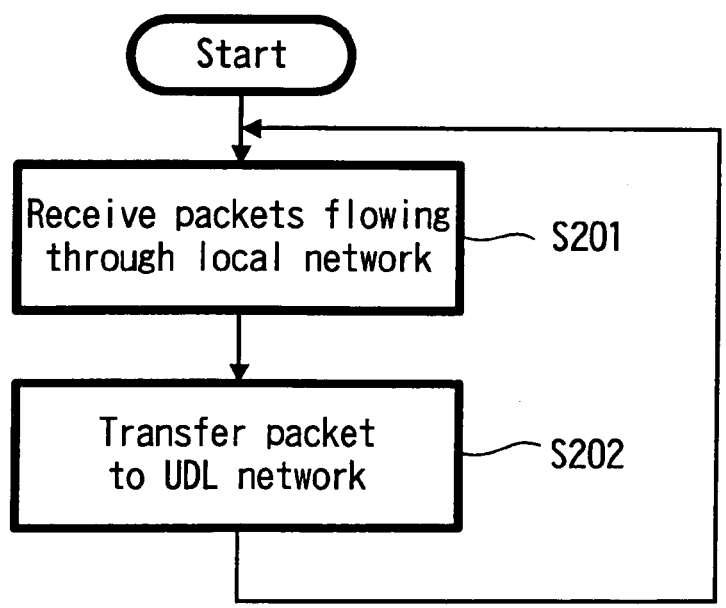
FIG. 4 illustrates the example of encapsulation of IP datagram in GRE.
Figure 5:
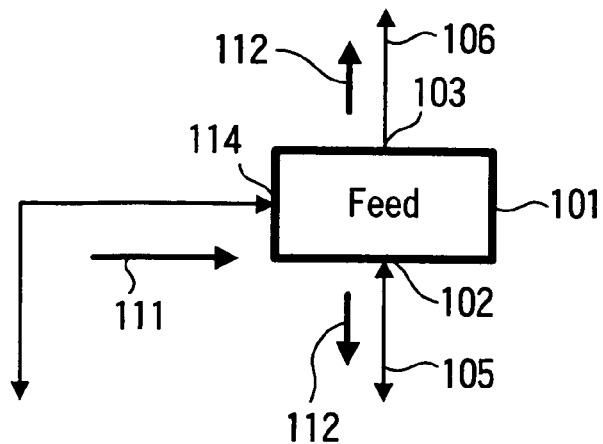
FIG. 5 is a block diagram of the processing for the bi-directional communication using UDLR when the feed functions as the router.
Figure 6:
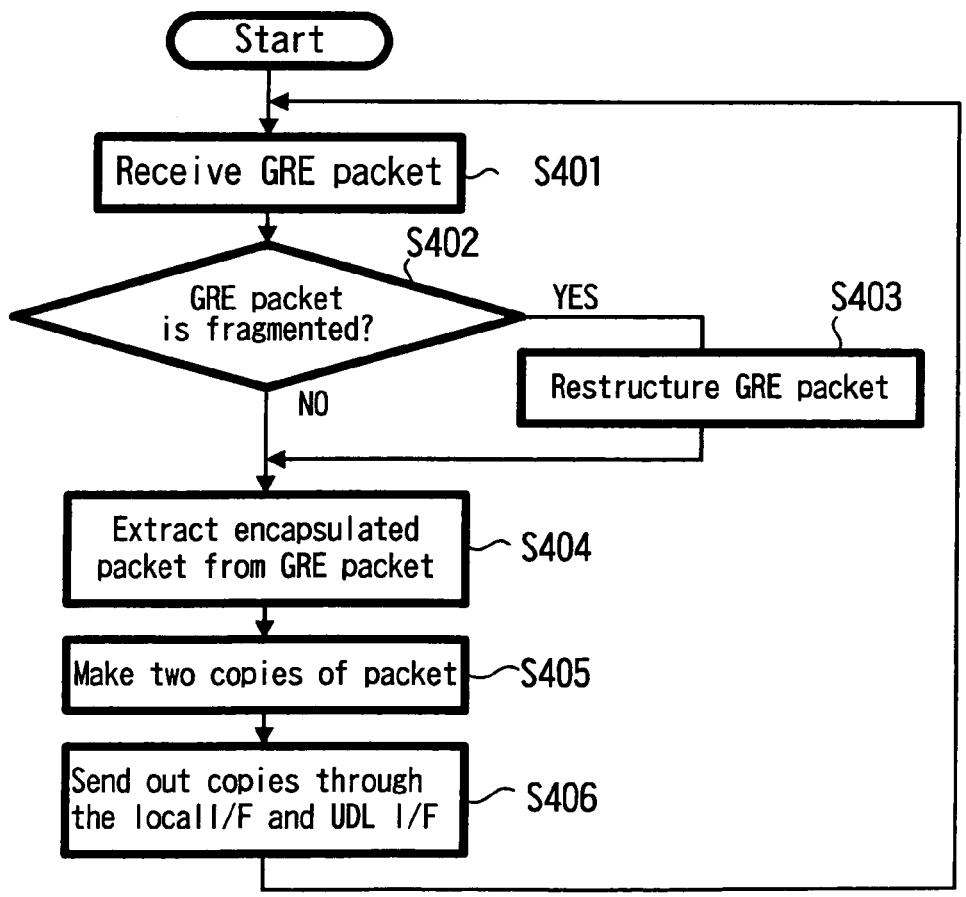
FIG. 6 is a block diagram of the example of the route from the receiving side to the transmitting side of the prior art.
Figure 7:
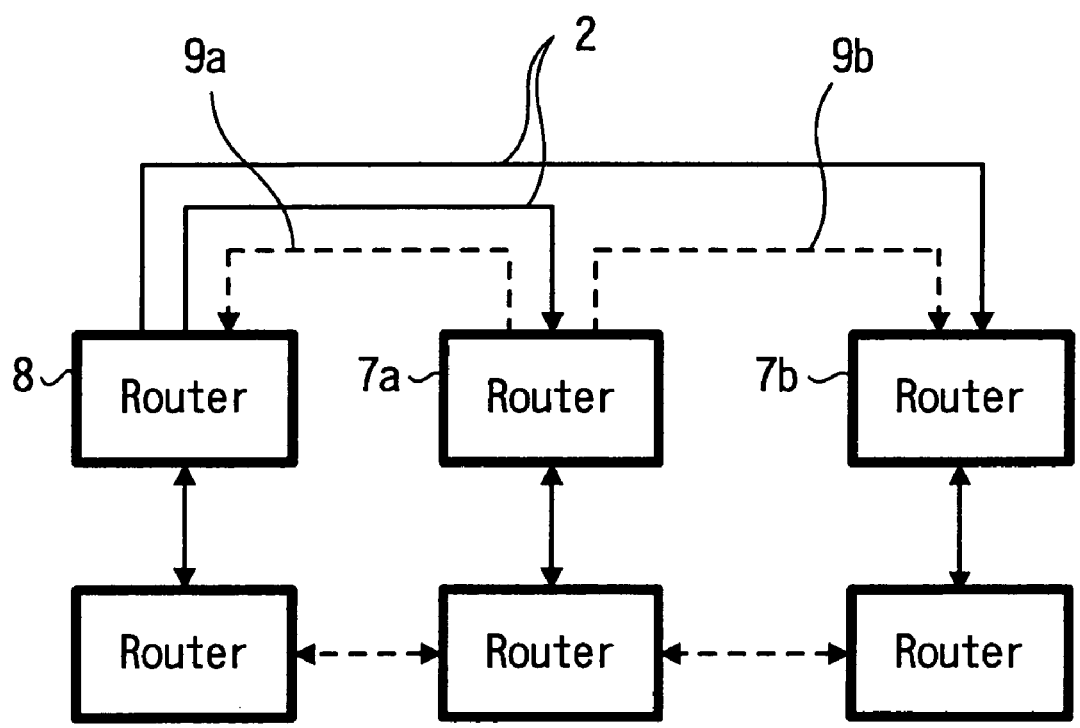
FIG. 7 is a block diagram of the example of the route from the receiving side to the other receiving side of the prior art.
Figure 8:
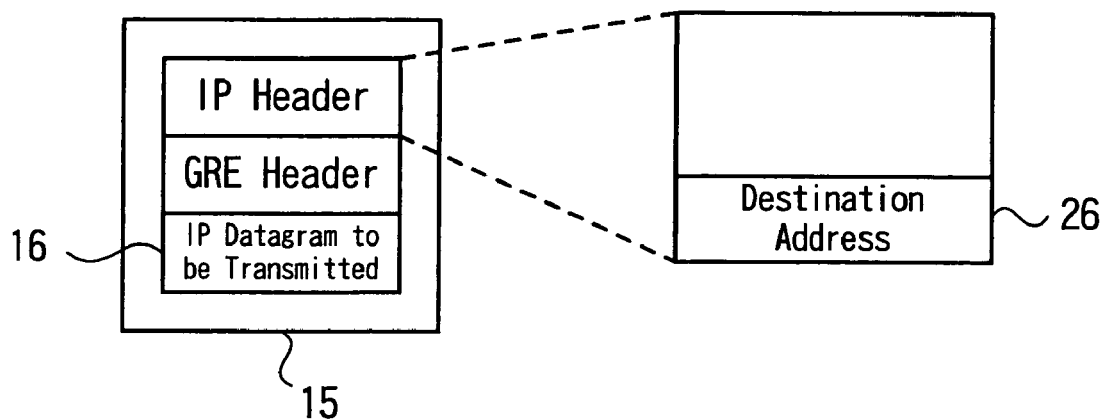
FIG. 8 is a block diagram of the example of the bi-directional communication using UDLR when the feed functions as the bridge of the prior art.
Figure 9:
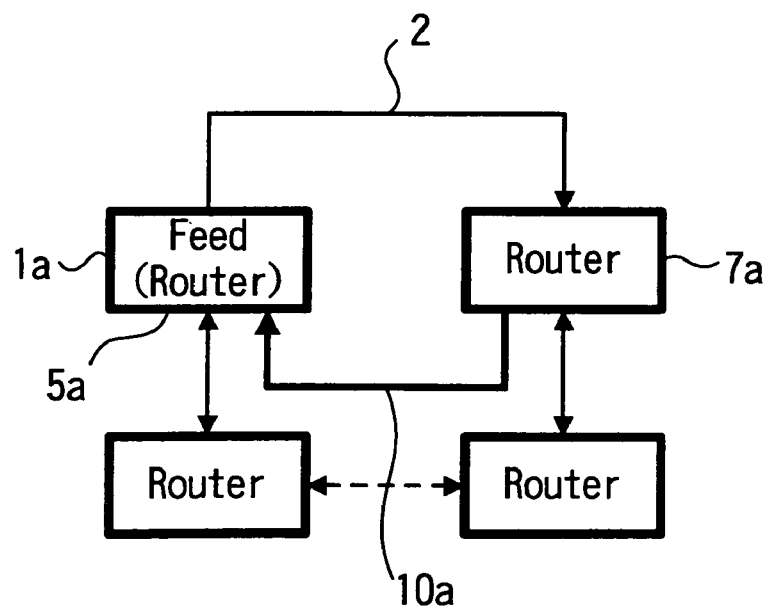
FIG. 9 is a block diagram of the example of the constitution of the bridge type feed supporting UDLR of the prior art.
Figure 10:
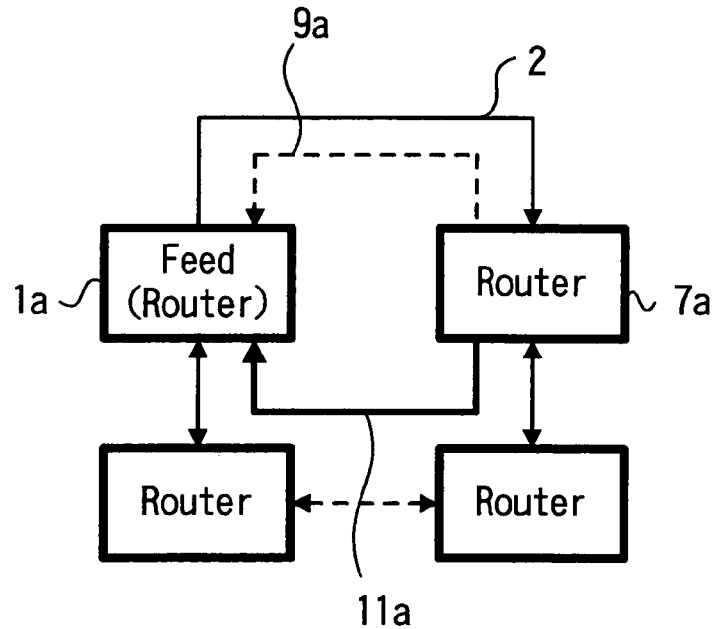
FIG. 10 is a flow chart of the example of the packet transfer function of the prior art.
Figure 11:
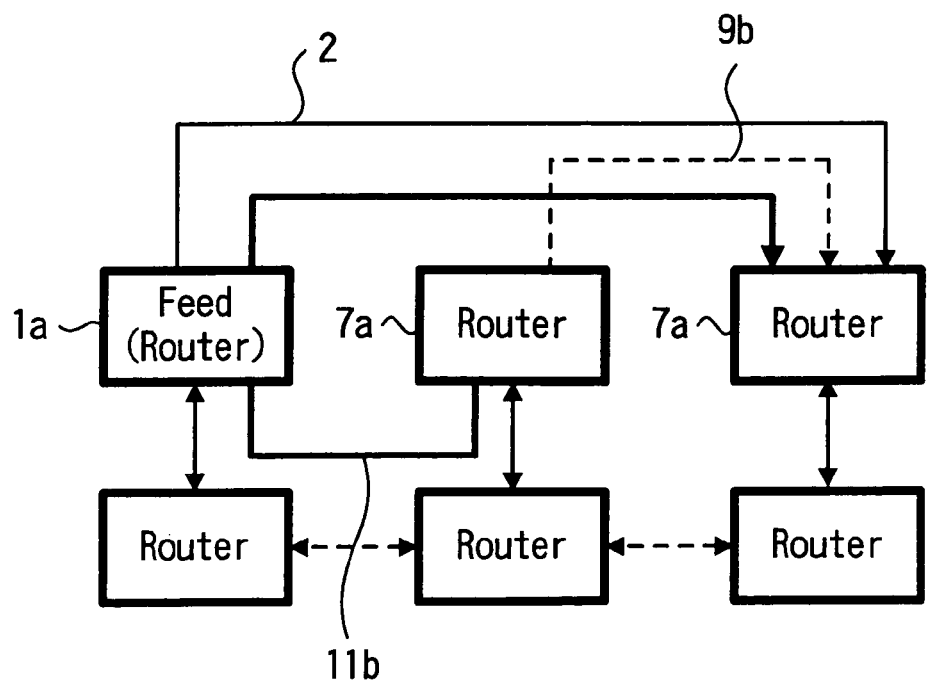
FIG. 11 is a block diagram for describing the UDLR function of the prior art.
Figure 12:
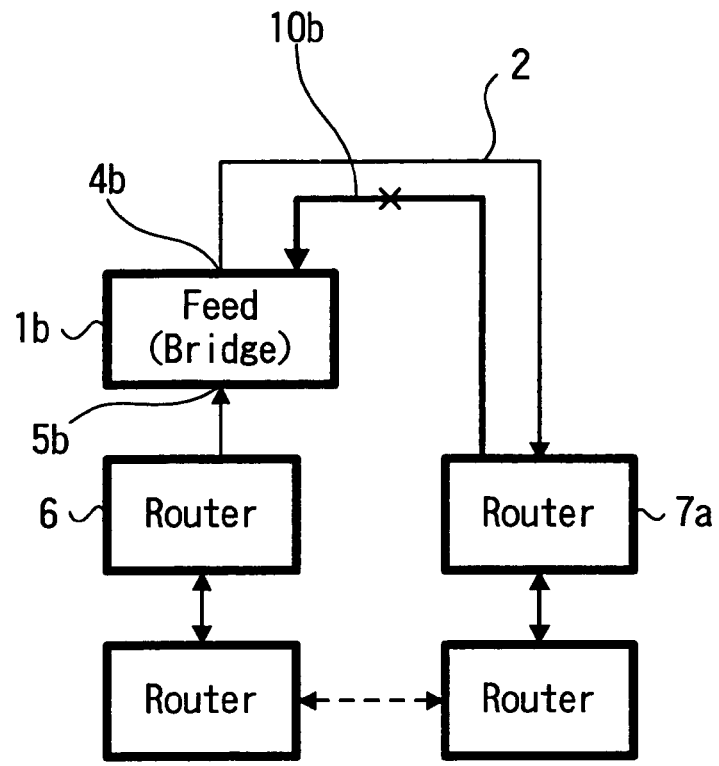
FIG. 12 is a flow chart of the flow of the UDLR function of the prior art.
Figure 13:
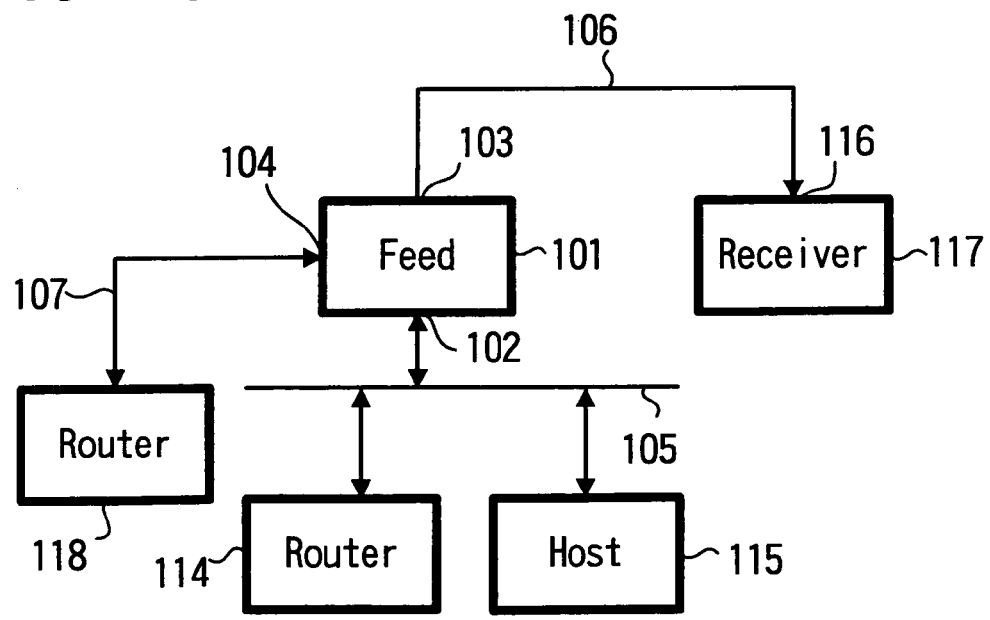
FIG. 13 is a block diagram of the example of the form of connection between the feed and other equipment of the prior art.
Figure 14:
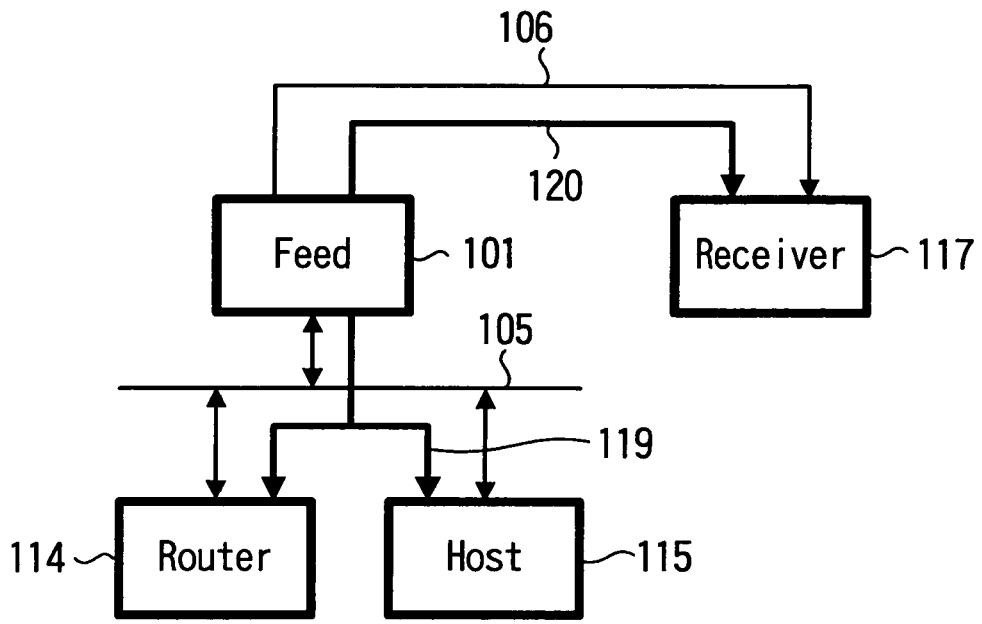
FIG. 14 is a block diagram for describing the packet transfer function in the feed of the prior art.
Figure 15:
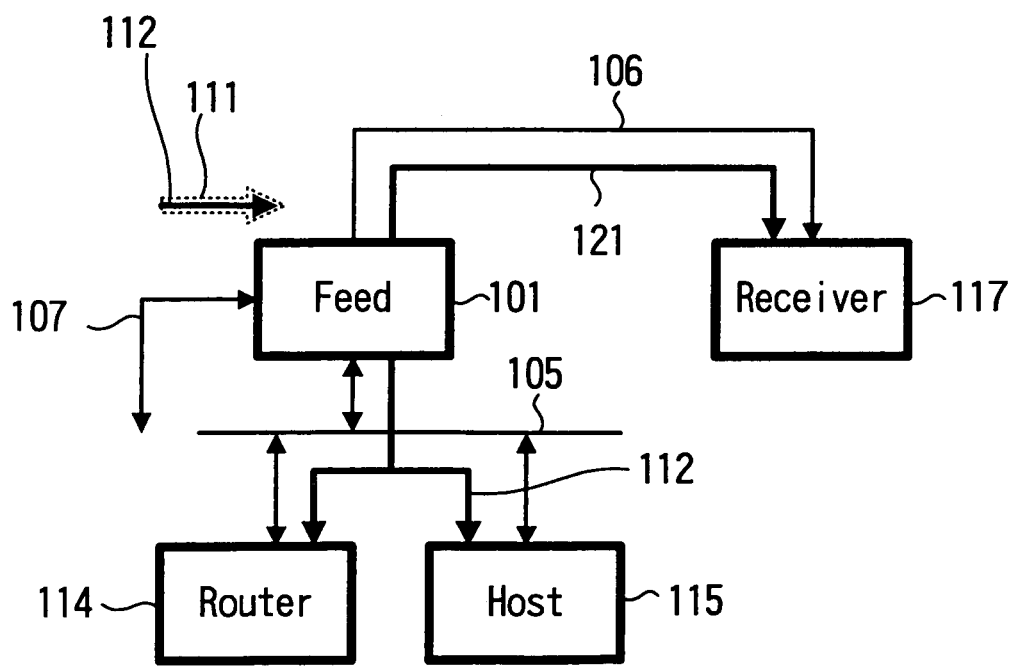
FIG. 15 is a block diagram for describing the UDLR

A first embodiment of the invention will be described below with reference to FIGS. 16 to 26. In FIGS. 16 to 26 for describing the first embodiment, elements corresponding to the elements in FIGS. 1, 2 and 7 to 12 described as the prior art are indicated by the same reference numerals, and the detailed description of these elements is omitted.

Figure 16:
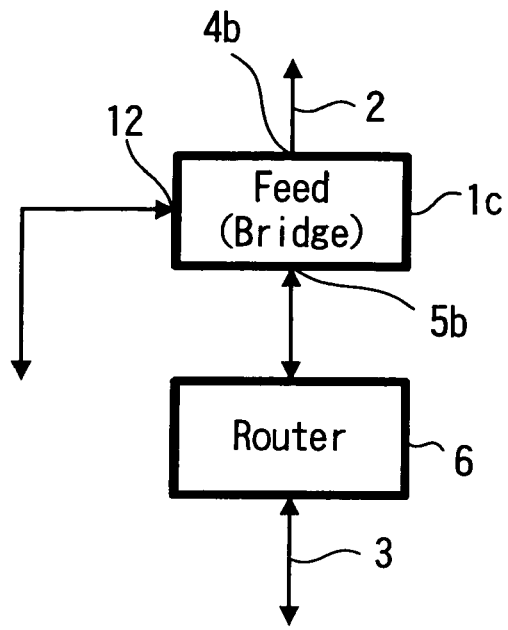
FIG. 16 is a block diagram of an example of a constitution according to a first embodiment of the invention.
Figure 17:
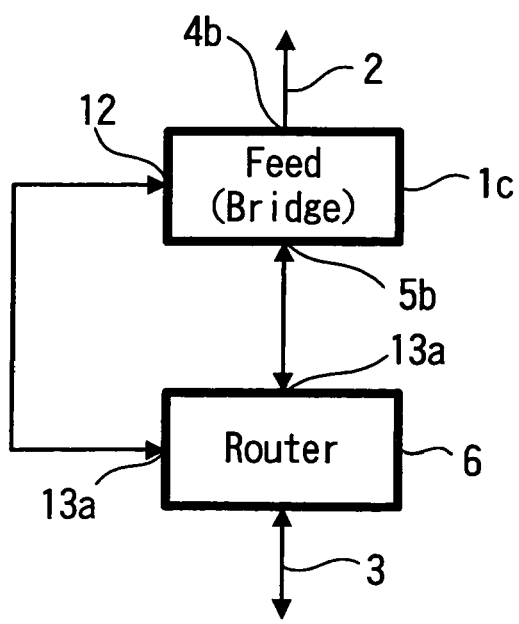
FIG. 17 is a block diagram of the example of the constitution according to the first embodiment of the invention (the example in which two interfaces of a feed are connected to the same router)
Figure 18:
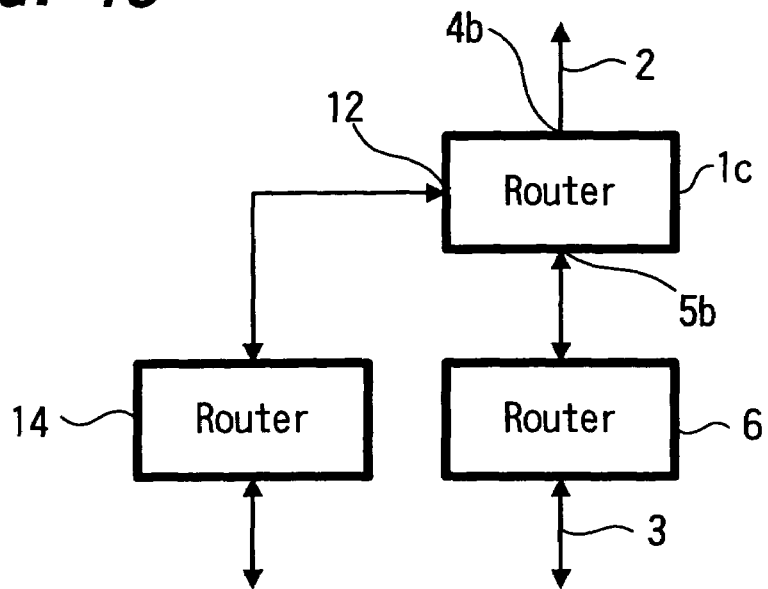
FIG. 18 is a block diagram of the example of the constitution according to the first embodiment of the invention (the example in which all the interfaces of the feed are connected to different routers)

Basic processing of the first embodiment is to add a new third interface 12 to a bridge type feed and thereby change the feed to a feed 1c having three interfaces, as shown in FIG. 16. The new interface 12 is a bi-directional interface for receiving a GRE packet. As shown in FIG. 17, the interface 12 may be connected to a different interface 13b from an interface 13a to which an interface 5b of the feed 1c is connected, among the interfaces of a router 6 to which the interface 5b is connected. Moreover, the interface 12 may be connected to a different router 14 from the router 6, as shown in FIG. 18. In any case, the interface 12 has an IP address belonging to a different network address from an interface 4b and the interface 5b.

Figure 19:
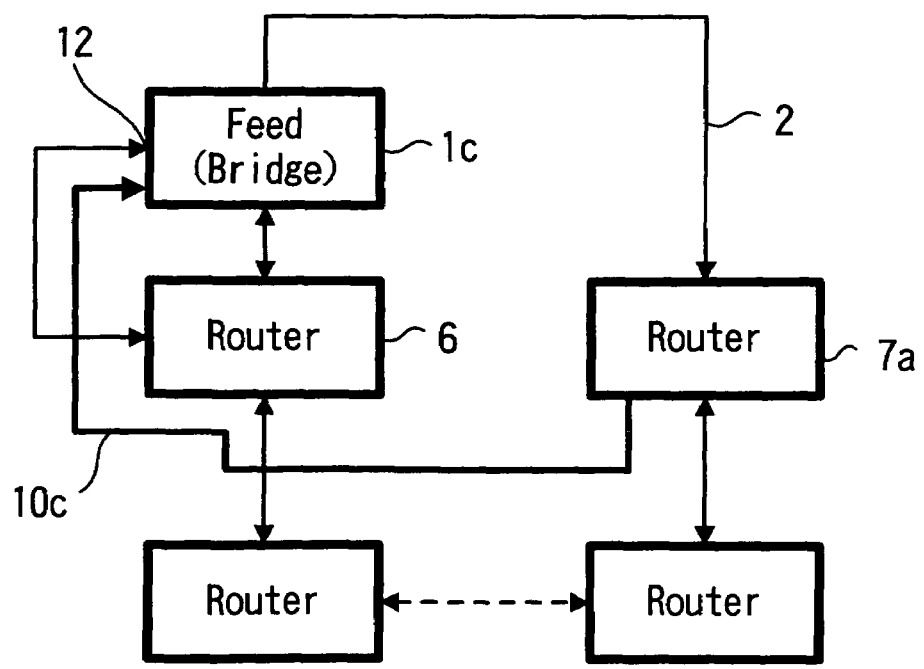
FIG. 19 is a block diagram of the example of the constitution according to the first embodiment of the invention (the example of transmission of a GRE packet to a bridge type feed capable of UDLR)

With the feed thus constituted, as shown in FIG. 19, when the GRE packet is transmitted from a router 7a at the receiving side on an uni-directional communication line to the feed 1c, the IP address of the interface 12 is specified in a destination address 26, whereby the GRE packet passes through a route 10c via the router 6 (or the router 14 in the case of a constitution shown in FIG. 18) and reaches to the feed 1c through the interface 12.

Figure 20:
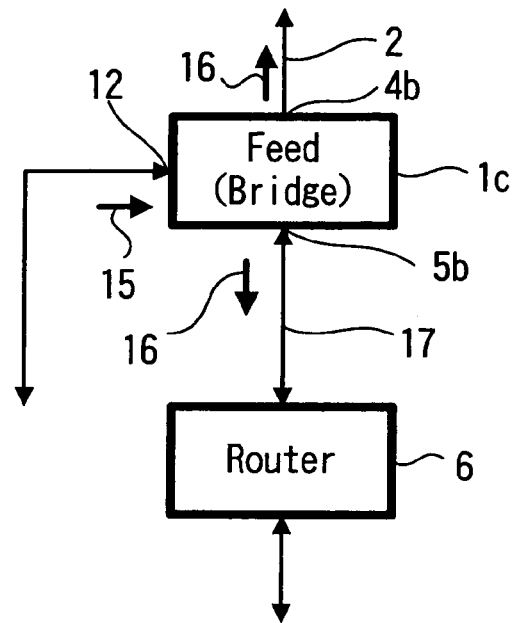
FIG. 20 is a block diagram of the example of the constitution according to the first embodiment of the invention (the example of a state in which the bridge type feed capable of UDLR transfers the contents of the GRE packet)

After the feed 1c receives the GRE packet, the feed 1c operates as shown in FIG. 20. That is, the feed 1c extracts encapsulated IP datagram 16 from a GRE packet 15 that arrives at the interface 12. Then, the feed 1c makes two copies of the extracted IP datagram 16. Then, the feed 1c sends out one copy to an uni-directional communication line 2 through the interface 4b and sends out the other copy to a communication route 17 to the router 6 through the interface 5b.

Thus, even the bridge type feed can virtually transmit the IP datagram backward to an uni-directional communication route. Therefore, bi-directional communication as UDLR can be realized.

Figure 21:
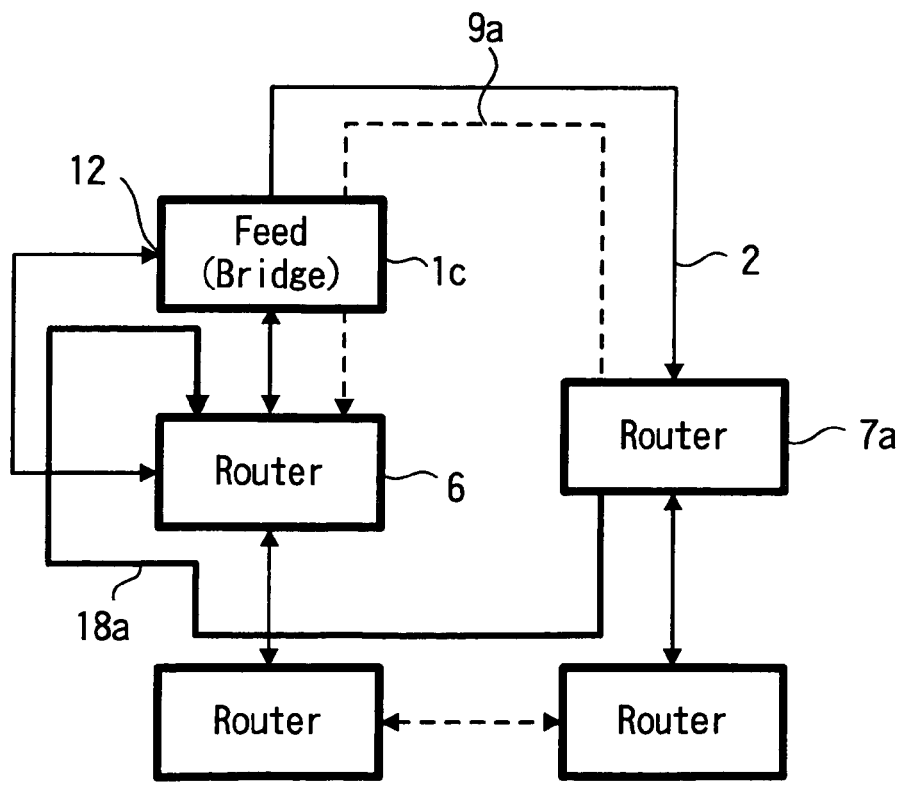
FIG. 21 is a block diagram of the example of the constitution according to the first embodiment of the invention (the example of a route from the receiving side to the transmitting side for the bridge type feed capable of UDLR)
Figure 22:
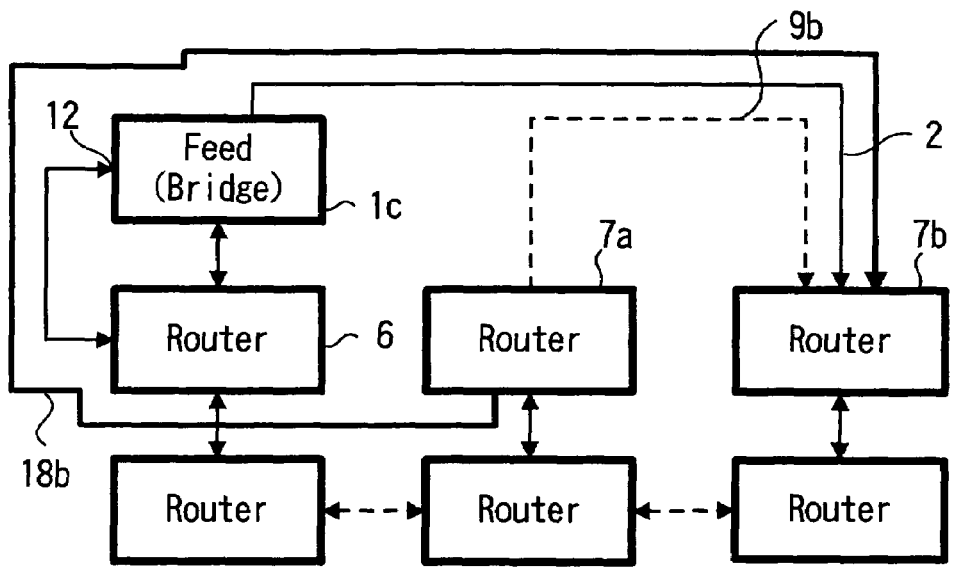
FIG. 22 is a block diagram of the example of the constitution according to the first embodiment of the invention (the example of the route from the receiving side to the other receiving side for the bridge type feed capable of UDLR)

For example, transmission (9a) of the IP datagram from the router 7a at the receiving side on the uni-directional communication line to the router 6 at the transmitting side on the uni-directional communication line by virtually using the uni-directional communication line backward is actually made via a route 18a shown in FIG. 21. Transmission (9b) of the IP datagram from the router 7a at the receiving side on the uni-directional communication line to a router 7b at the other receiving side on the uni-directional communication line by virtually using the uni-directional communication line backward is actually made via a route 18b shown in FIG. 22.

The constitution of a communication system using a satellite line as the uni-directional communication line in this embodiment will be described below.

Figure 23:
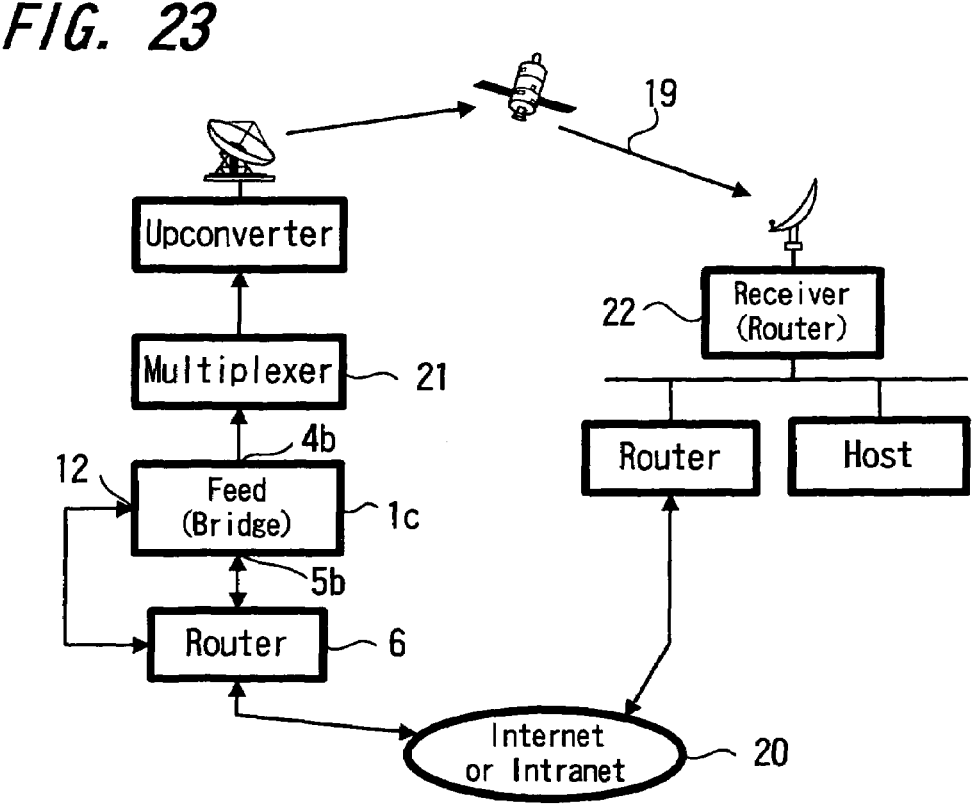
FIG. 23 is a block diagram of the example of the constitution according to the first embodiment of the invention (the example in which the bridge type feed capable of UDLR is used for a satellite line)

FIG. 23 shows the constitution of an actual system using the feed according to this embodiment. In this system, a satellite line 19 is used as the uni-directional communication line 2, and the Internet or an intranet 20 using a ground line is used as a bi-directional communication line 3. In this case, the feed 1c has the two interfaces (5b and 12) connected to the same router 6, similarly to an example shown in FIG. 17.

In the example of FIG. 23, the interface 4b to the uni-directional communication line 2 is the interface for outputting an MPEG2 transport stream such as DVI-ASI. The feed 1c encodes the IP datagram to the MPEG2 transport stream by using a format standardized by DVB and DAVIC (a multiprotocol encapsulation format or the like) and then outputs the MPEG2 transport stream to a multiplexer 21 through the interface 4b. The interfaces 5b and 12 are the interface for Ethernet such as 10BASE-T or 100BASE-TX and connected to the router 6 through Ethernet.

Figure 24:
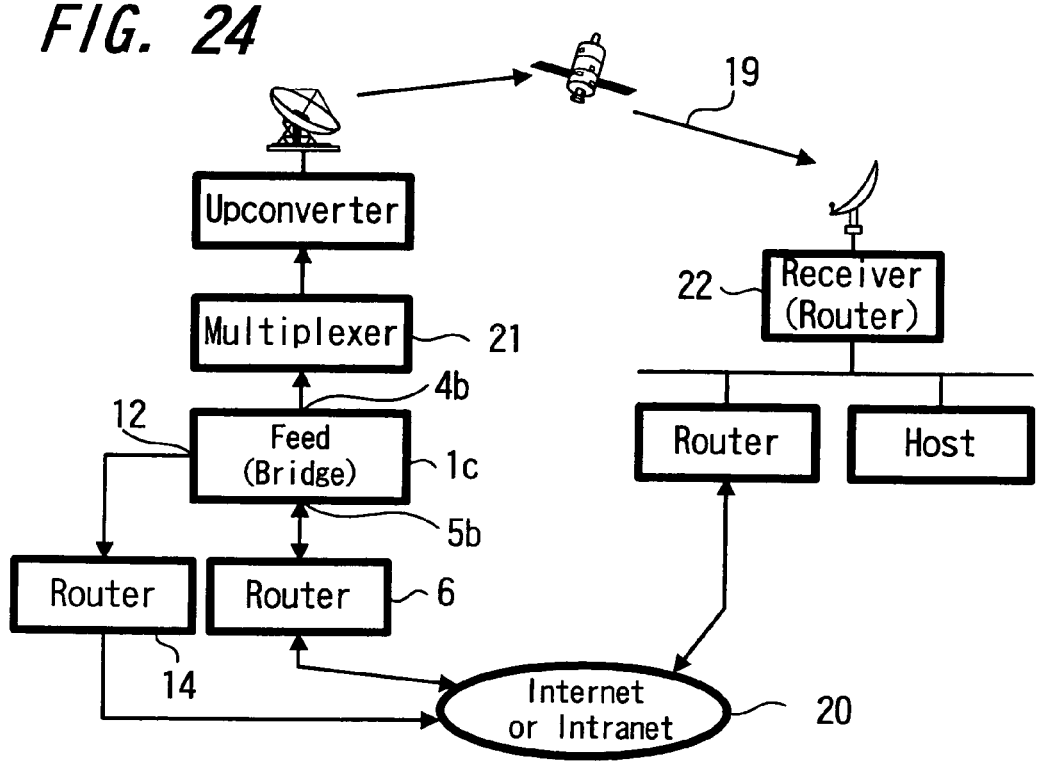
FIG. 24 is a block diagram of the example of the constitution according to the first embodiment of the invention (another example in which the bridge type feed capable of UDLR is used for the satellite line)

The feed 1c in the system of the constitution shown in FIG. 23 is changed to the feed 1c connected to the different routers (6 and 14) as shown in FIG. 18, whereby the system of the example shown in FIG. 24 is obtained.

Figure 25:
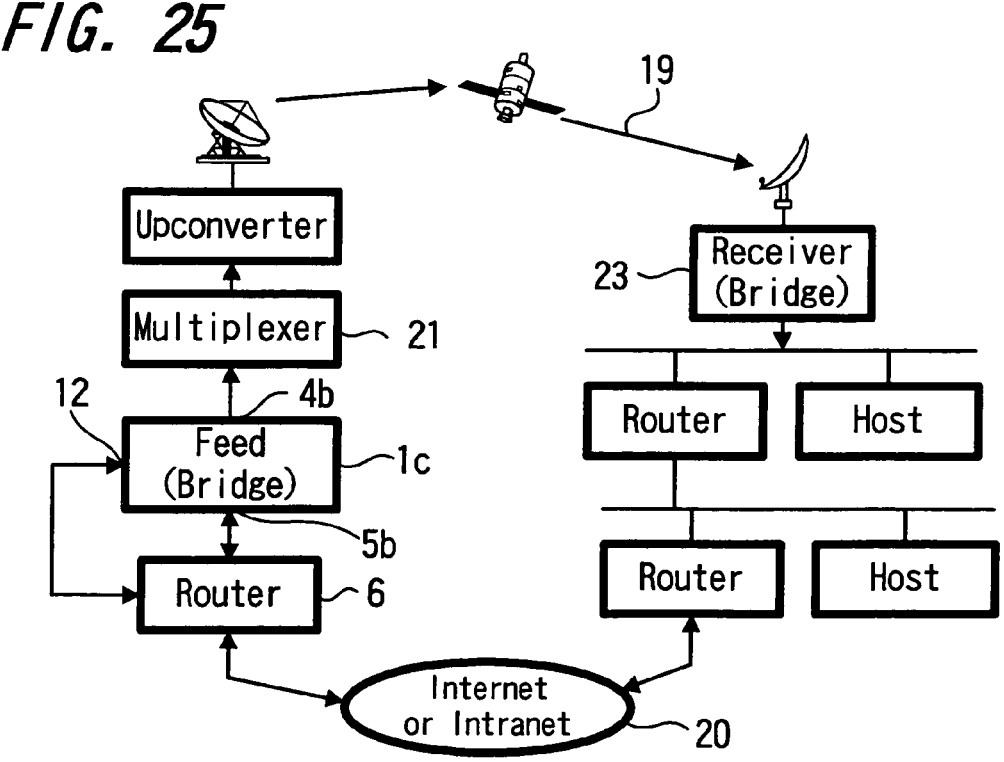
FIG. 25 is a block diagram of the example of the constitution according to the first embodiment of the invention (the example in which a receiver functions as a bridge)

In the examples shown in FIGS. 23 and 24, a receiver 22, which is a receiver for the satellite line functions as the router. However, the receiver can be implemented not as a router but as a bridge, similarly to the feed that is implemented as both of the router and the bridge. The example shown in FIG. 25 is obtained by changing the receiver in the system of the constitution shown in FIG. 23 from the router 22 to a bridge 23.

Figure 26:
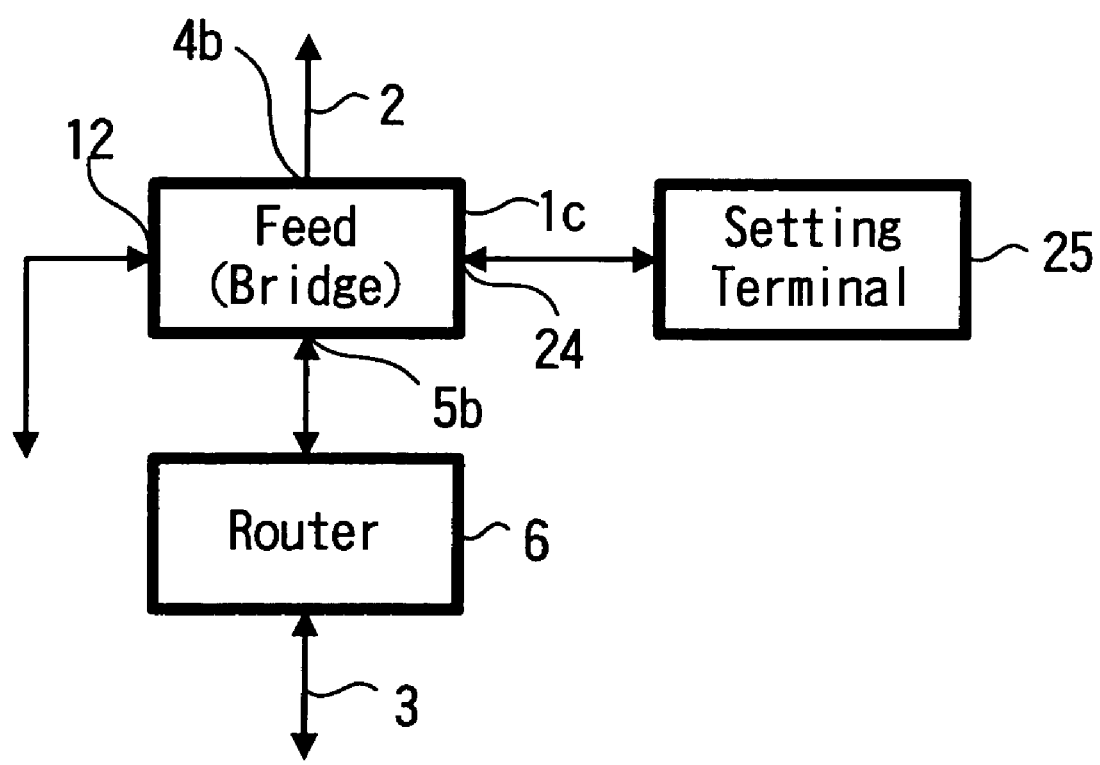
FIG. 26 is a block diagram of the example of the constitution according to the first embodiment of the invention (the example of the feed having an additional interface for setting)
Figure 27:
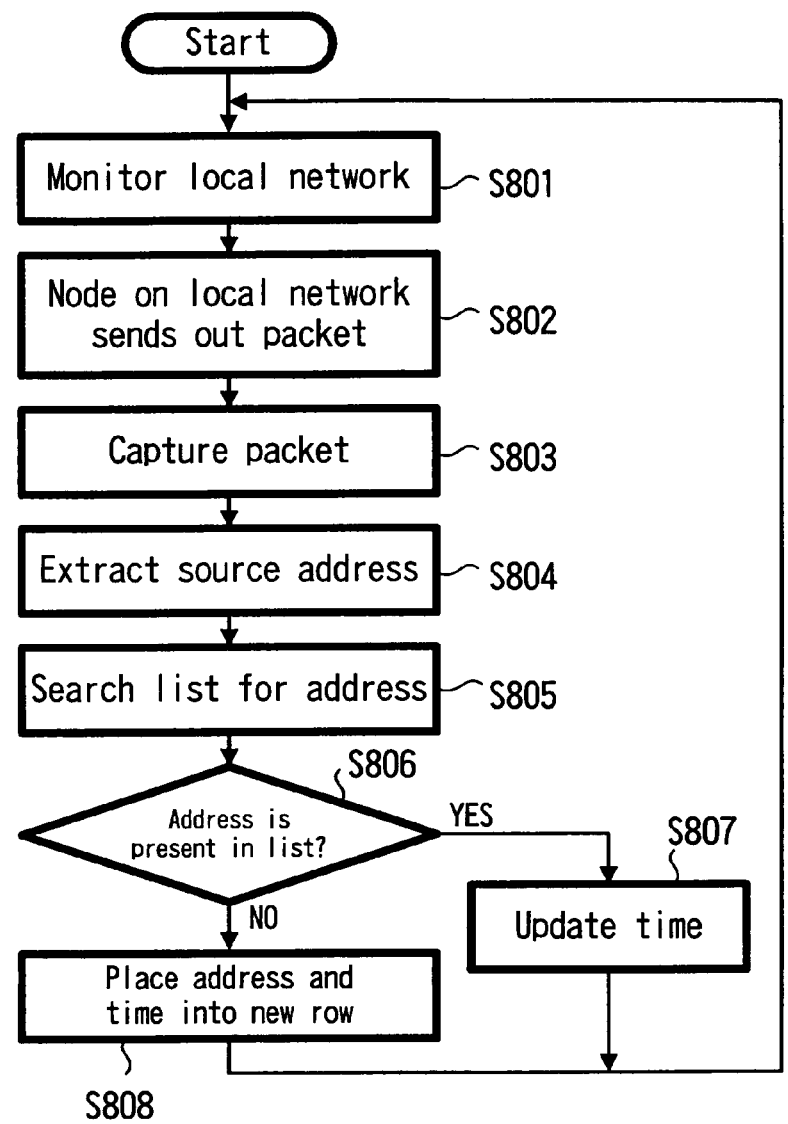
FIG. 27 is a flow chart of the example of processing for learning an address according to a second embodiment of the invention.

The feed is a network apparatus and needs to appropriately set the IP address or the like. Conveniently, setting of the feed can be made via a network by using Telenet or the like. The bridge type feed 1c capable of the bi-directional communication as UDLR of this embodiment has the three interfaces (4b, 5b and 12). Any interface is intended to perform a function of the feed. When any one of these interfaces is used for the setting of the feed, an adverse effect may be given to the inherent function of the feed. For such a case, it is safe that the feed has an additional fourth interface 24 for setting the feed as shown in FIG. 26. The interface 24 is connected to a setting terminal 25 such as a personal computer through the interface for Ethernet such as 10BASE-T or 100BASE-TX, a serial communication interface such as RS-232C, or the like. The setting terminal 25 makes connection through Telenet or the like, thereby making the setting of the feed.

Next, a second embodiment of the invention will be described with reference to FIGS. 27 to 37. In FIGS. 27 to 37 for describing the second embodiment, the elements corresponding to the elements in FIGS. 3 to 6 and 13 to 15 described in the prior art are indicated by the same reference numerals, and the detailed description of these elements is omitted.

The basic processing of the second embodiment is that a feed 101 stores the addresses of nodes (communication equipment such as a router 114 and a host 115) connected to a local network 105 so as not to transfer the packet addressed to the node connected to the local network 105 to a UDL network 106.

In order to perform this basic processing, the feed 101 learns the addresses of the nodes connected to the local network 105. First, this learning processing will be described. Next, how the feed 101 prevents the transfer of a useless packet to the UDL network 106 by use of the learned addresses will be described. Subsequently, how the feed 101 automatically updates the learned addresses will be described. Finally, a scheme for implementation will be described. For the description, the local network 105 and a tunnel network 107 are assumed to be Ethernet such as 10BASE-T or 100BASE-TX. However, these networks do not have to be Ethernet. Any network will do as long as it performs the processing having a data format having the destination address and a source address.

Now, the processing, in which the feed 101 learns the addresses of the nodes connected to the local network 105, will be described. A basic idea is the processing in which the feed 101 learns the source addresses of the captured packets when the feed 101 captures all the packets flowing through the local network 105 for a packet transfer function 110. This will be described with reference to a flow chart of FIG. 27.

First, the feed 101 monitors the packets flowing through the local network 105 (S801). The node connected to the local network 105 sends out a packet 122 (S802). The packet 122 is any arbitrary packet such as the IP datagram, ICMP or ARP, and any packet flows through the local network 105 in a state of an Ethernet frame. Moreover, the destination of the packet 122 is arbitrary and is not limited to the node on the local network 105. Thus, the packet 122 may be addressed to the node on any other network or may be multicast or broadcast.

Then, the feed 101 captures the packet 122 therein through a local I/F 102 (S803). Since the local I/F 102 of the feed 101 is adapted to be capable of obtaining not only the packet addressed to the local I/F 102 but also all the packets flowing through the local network 105 in order to perform the packet transfer function 110, the local I/F 102 can capture the packet 122.

Figure 28:
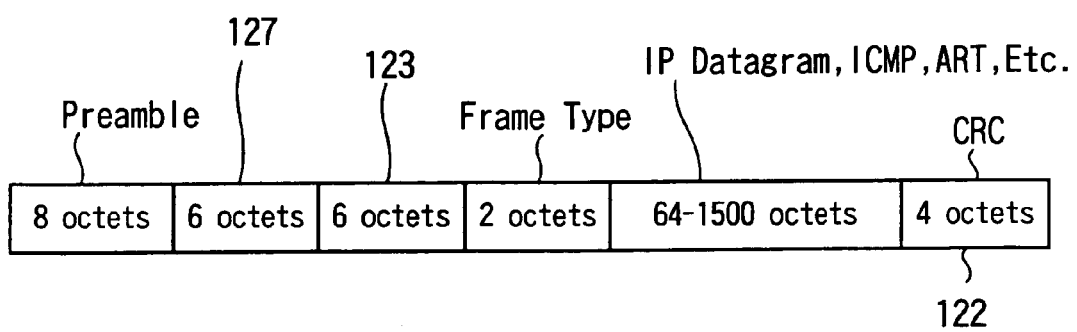
FIG. 28 illustrates the example of a format according to the second embodiment of the invention.

Then, the feed 101 extracts a source address 123 of the Ethernet frame from the packet 122 (S804). The data format of the packet 122 is structured as shown in FIG. 28, for example. Then, the feed 101 searches a list 124 of the addresses of the nodes connected to the local network 105 for the source address 123 of the packet 122 (S805). The list 124 has a structure shown in FIG. 29, for instance. Each row comprises a column 125 for containing the address of the node connected to the local network 105 and a column 126 for containing the last time the address is learned.

The feed 101 checks whether or not the address 123 is present in the address column 125 of the list 124 (S806). When the address 123 is present in the column 125, a value in the time column 126 in the row having the address is updated so that the value is changed to the current time (S807). On the other hand, when the address 123 is not present in the address column 125 of the list 124, a new row is created and then the address 123 and the current time are placed into the columns 125 and 126 in the new row, respectively. (S808).

This ends the learning of the address from the packet 122. The feed 101 returns to step S801 and prepares for the learning of the address from the subsequent packet flowing through the local network 105. By the above method, the feed 101 learns the addresses of the nodes connected to the local network 105.

Next, how the feed 101 prevents the transfer of the useless packet to the UDL network 106 by use of the learned addresses will be described. This will be described with reference to the flow chart for each function of the feed 101. First, the processing for the packet transfer function 110 will be described. Next, the processing for a UDLR function 113 will be described.

Figures 29, 30:
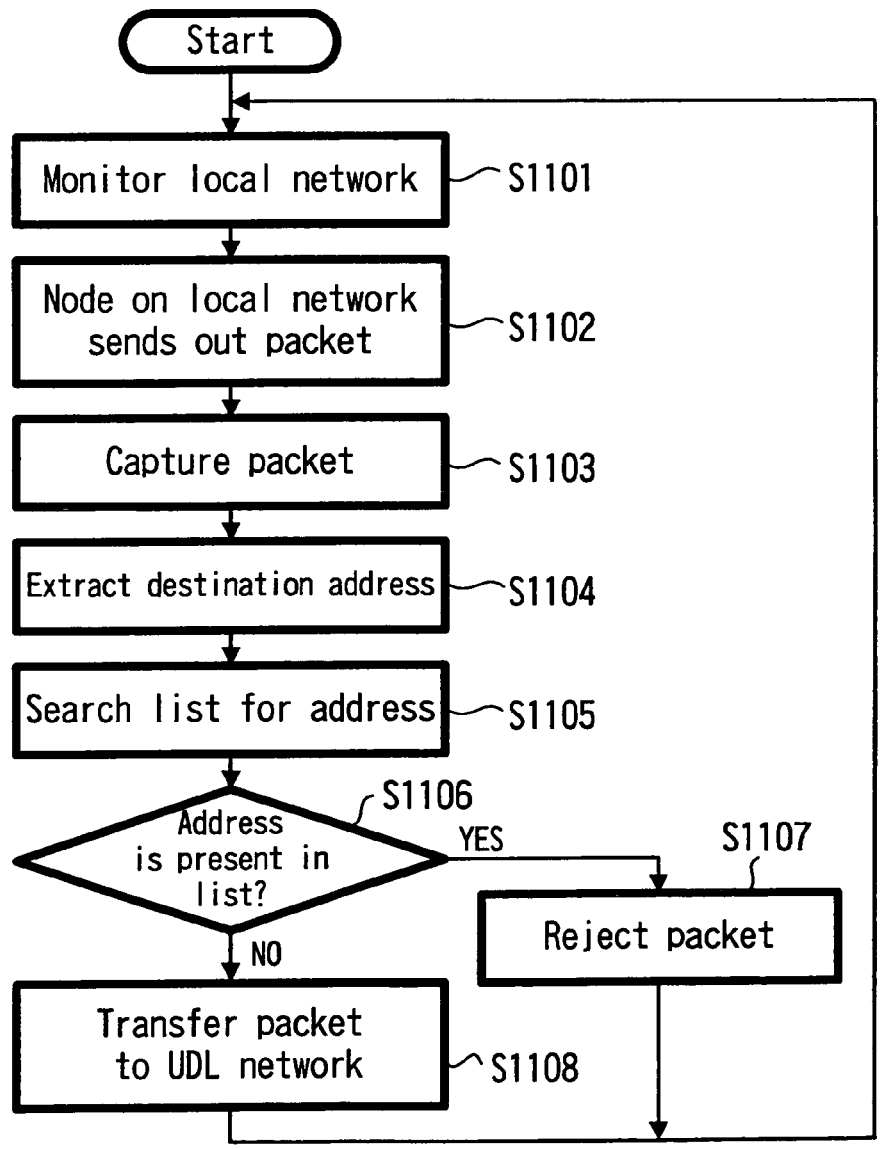
FIG. 29 illustrates the example of an address list according to the second embodiment of the invention.
FIG. 30 is a flow chart of a flow of a packet transfer function according to the second embodiment of the invention.
Figure 31:
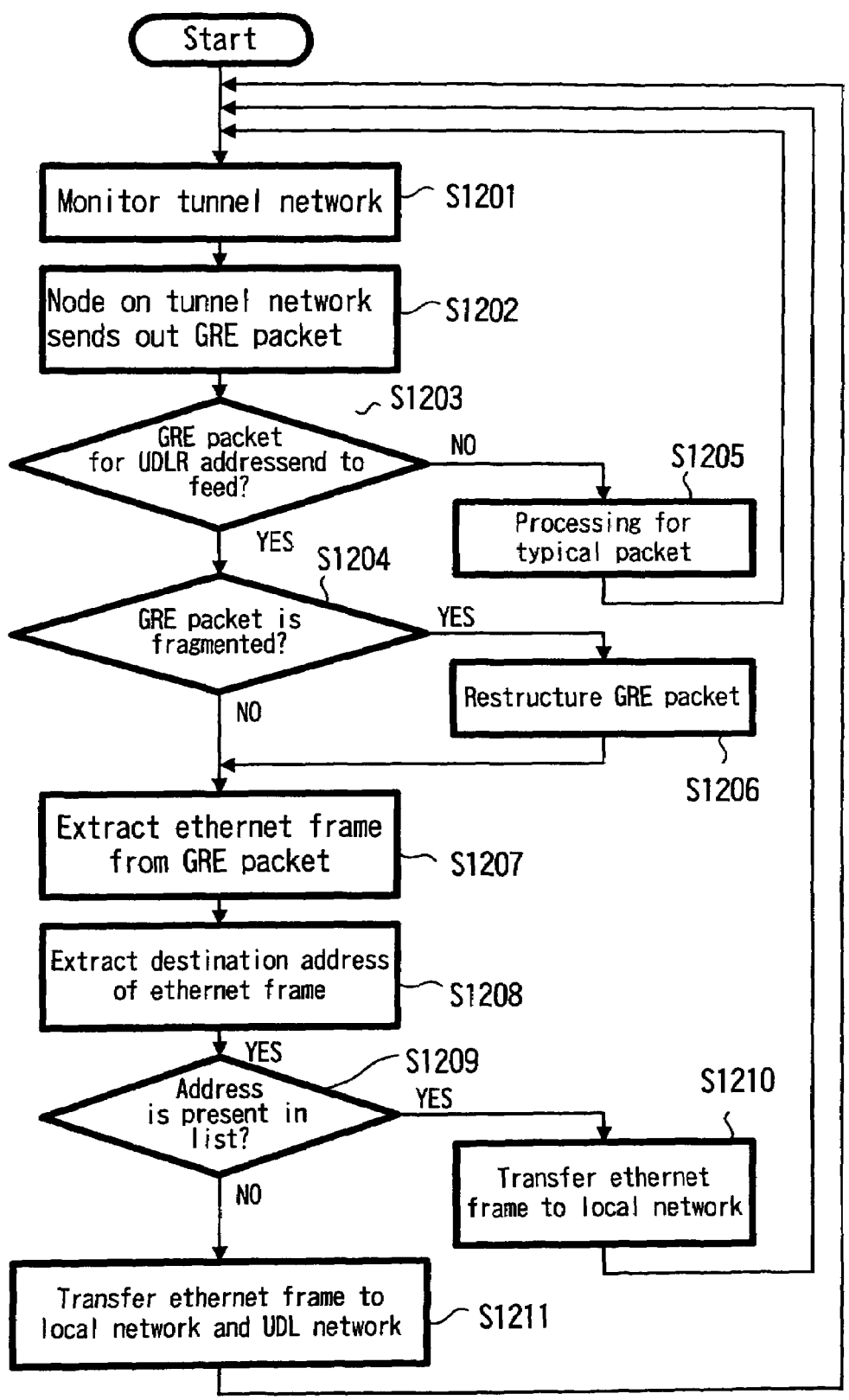
FIG. 31 is a flow chart of the flow of a UDLR function according to the second embodiment of the invention.

First, when the feed 101 performs the packet transfer function 110, the feed 101 prevents the transfer of the useless packet as shown in the flow chart of FIG. 30. At first, the processing is the same as the processing of FIG. 27. First, the feed 101 monitors the packets flowing through the local network 105 (S1101). The node connected to the local network 105 sends out the packet 122 (S1102). The packet 122 is any arbitrary packet such as the IP datagram, ICMP or ARP, and any packet flows through the local network 105 in the state of the Ethernet frame. Moreover, the destination of the packet 122 is arbitrary and is not limited to the node on the local network 105. Thus, the packet 122 may be addressed to the node on any other network or may be multicast or broadcast.

Then, the feed 101 captures the packet 122 therein through the local I/F 102 (S1103). Then, the feed 101 extracts a destination address 127 of the Ethernet frame from the packet 122 (S1104). Then, the feed 101 searches the address column 125 of the list 124 for the extracted destination address 127 (S1105). As a result of search, the feed 101 determines whether or not the feed 101 transfers the packet 122 in accordance with whether or not the destination address 127 is present in the list 124 (S1106). When the destination address 127 is present in the list 124, the packet is regarded as the packet addressed to the node on the local network 105. Thus, the packet does not require to be transferred to the UDL network 106, and thus the packet is rejected (S1107). On the other hand, when the extracted destination address 127 is not present in the address column 125 of the list 124, the packet is regarded as the packet addressed to the node not existing on the local network 105, and thus the packet is transferred to the UDL network 106 (S1108).

This ends the processing of the packet 122 for the packet transfer function 110. The feed 101 returns to step S1101 and prepares for the processing of the subsequent packet flowing through the local network 105. By the above processing, the feed 101 prevents the useless transfer of the packet flowing through the local network 105 to the UDL network 106.

Figure 32:
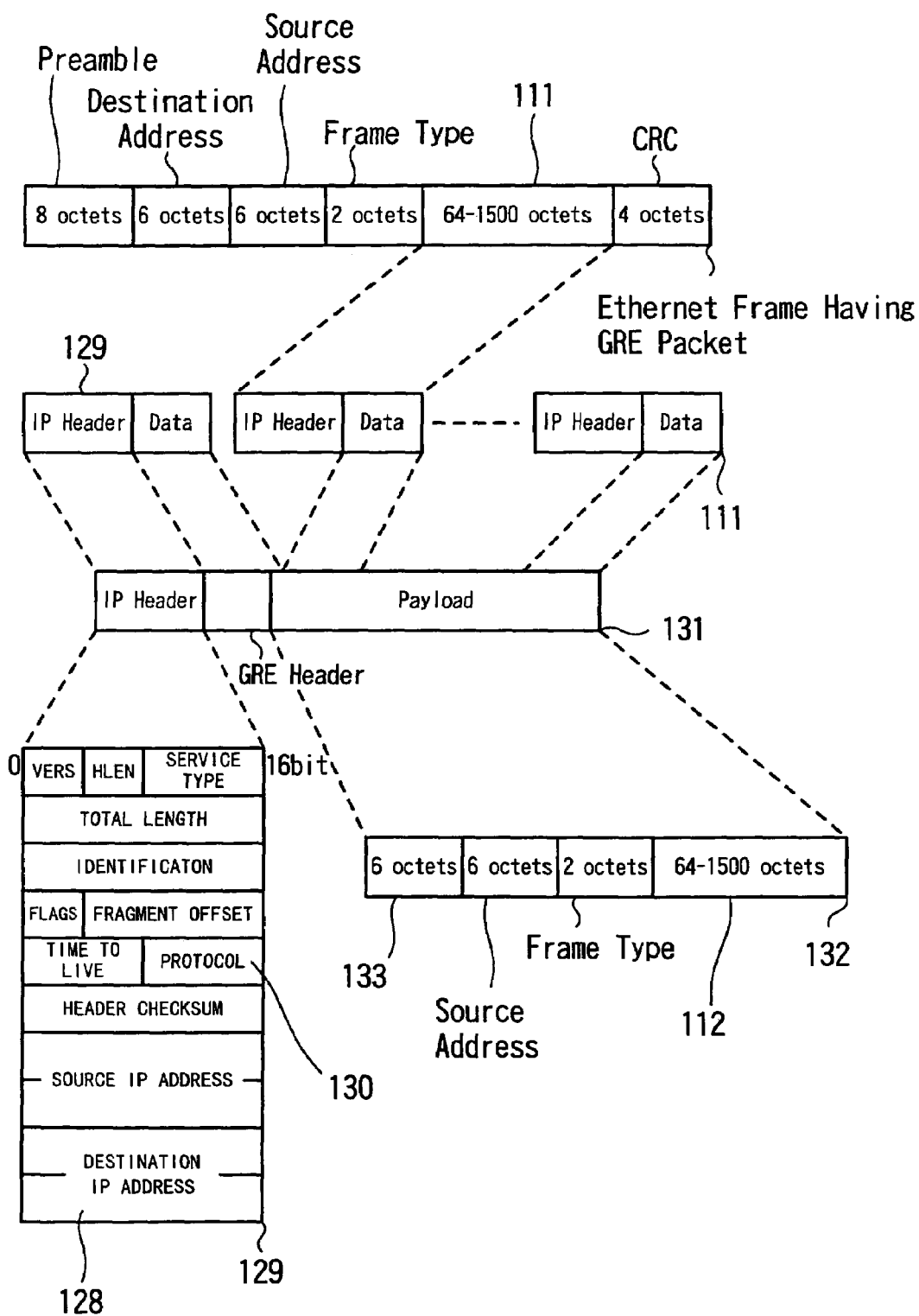
FIG. 32 illustrates the format of the GRE packet according to the second embodiment of the invention.

Next, the processing for the UDLR function 113 will be described. When the feed 101 performs the UDLR function 113, the feed 101 performs the processing as shown in the flow chart of FIG. 31, thereby preventing the transfer of the useless packet. First, the feed 101 monitors the packets flowing through the tunnel network 107 (S1201). The node connected to the tunnel network 107 sends out a GRE packet 111 (S1202). As shown in FIG. 32, the GRE packet 111 has an arbitrary packet 112 such as the IP datagram, ICMP or ARP encapsulated in a data portion of the IP datagram in the form of the Ethernet frame, and the IP datagram is further contained in the Ethernet frame. The GRE packet 111 thus structured flows through the tunnel network 107. The feed 101 checks whether or not a destination IP address 128 of the GRE packet 111 is the IP address of a tunnel I/F 104 of the feed 101 and whether or not the value of a protocol field 130 of an IP header 129 is equal to a predetermined value (147, the value indicating the GRE packet) (S1203). When the check results in an affirmative, the feed 101 goes to next step S1204. When the check results in a negative, the packet is regarded as a typical packet not associated with UDLR and the feed 101 performs the processing S1205 for the typical packet. After that, the feed 101 returns to step S1201, i.e., a wait state.

In step S1204, the feed 101 checks whether or not the GRE packet 111 is fragmented. When the GRE packet 111 is fragmented, the feed 101 performs the processing for restructure (S1206). The detailed description of the processing for the restructure is herein omitted. It is assumed that the feed 101 goes from step S1206 to step S1207 and the feed 101 captures a complete GRE packet 131 restructured. When the GRE packet 111 is not fragmented, the feed 101 captures the GRE packet 111 as it is as the complete GRE packet 131. Then, the feed 101 goes to step S1207.

Then, the feed 101 extracts an Ethernet frame 132 from the GRE packet 131 (S1207). Furthermore, the feed 101 extracts a destination address 133 of Ethernet from the Ethernet frame 132 (S1208). Then, the feed 101 searches the address column 125 of the list 124 for the extracted destination address 133 (S1209). When the destination address 133 is present in the column 125, the packet is regarded as the packet addressed to the node on the local network 105. Thus, the packet does not require to be transferred to the UDL network 106, and thus the Ethernet frame 132 is outputted through the local I/F 102 and transferred onto the local network 105 (S1210). On the other hand, when the extracted destination address 133 is not present in the address column 125 of the list 124, the Ethernet frame 132 is regarded as the frame addressed to the node not existing on the local network 105, the frame addressed to the node existing on the local network 105 but having the address that is not yet learned by the feed 101, or the broadcast or multicast frame. Thus, the feed 101 makes two copies of the Ethernet frame 132. Then, the feed 101 transfers one copy to the local network 105 through the local I/F 102 and transfers the other copy to the UDL network 106 through a UDL I/F 103 (S1211).

This ends the processing of the GRE packet 111 for the UDLR function 113. The feed 101 returns to step S1201 and prepares for the processing of the subsequent packet flowing through the tunnel network 107. By the above method, the feed 101 prevents the useless transfer of the contents of the GRE packet inputted from the tunnel network 107 to the UDL network 106.

Figure 33:
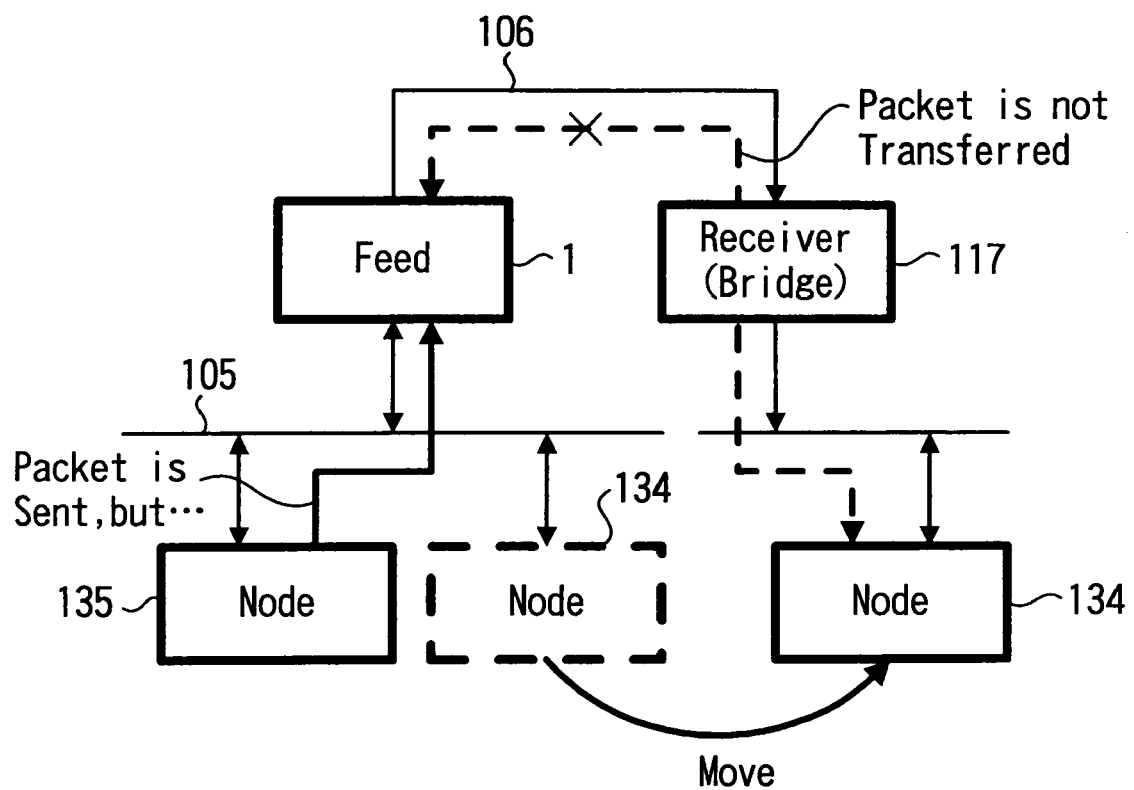
FIG. 33 is a block diagram of the example of the constitution according to the second embodiment of the invention (the example in which it is necessary to delete the learned address)

Next, the processing, in which the feed 101 automatically updates the learned addresses, will be described. When the feed 101 permanently keeps the learned addresses without deleting the learned addresses, a problem may arise. This problem arises when a node 134 connected to the local network 105 is disconnected from the local network 105 and the node 134 is connected to any other network such as the UDL network 106, as shown in FIG. 33. Details of the problem are as follows. First, the feed 101 learns the address of the node 134 connected to the local network 105. Then, the node 134 is disconnected from the local network 105 and the node 134 is connected to the receiving side of the UDL network 106. In this state, even if an attempt is made to send the packet from a node 135 on the local network 105 to the node 134 on the UDL network 106, the feed 101 rejects the packet because the address of the node 134 remains in the list 124. Thus, the packet is not transferred to the UDL network 106, and therefore the communication from the node 135 to the node 134 cannot be carried out.

In order to solve this problem, the feed 101 does not permanently hold the addresses in the list 124 but updates the list 124 at regular intervals and deletes unnecessary addresses. For deletion, the feed 101 deletes the address of the node which does not send out the packet to the local network 105 for a fixed time period or longer, for example. The fixed time period is set with reference to the time shorter than the time required to disconnect the node 134 on the local network 105 from the local network 105 and to connect the node 134 to any other network. Specifically, the setting of, for example, about 3 minutes would cause no problem.

Figure 34:
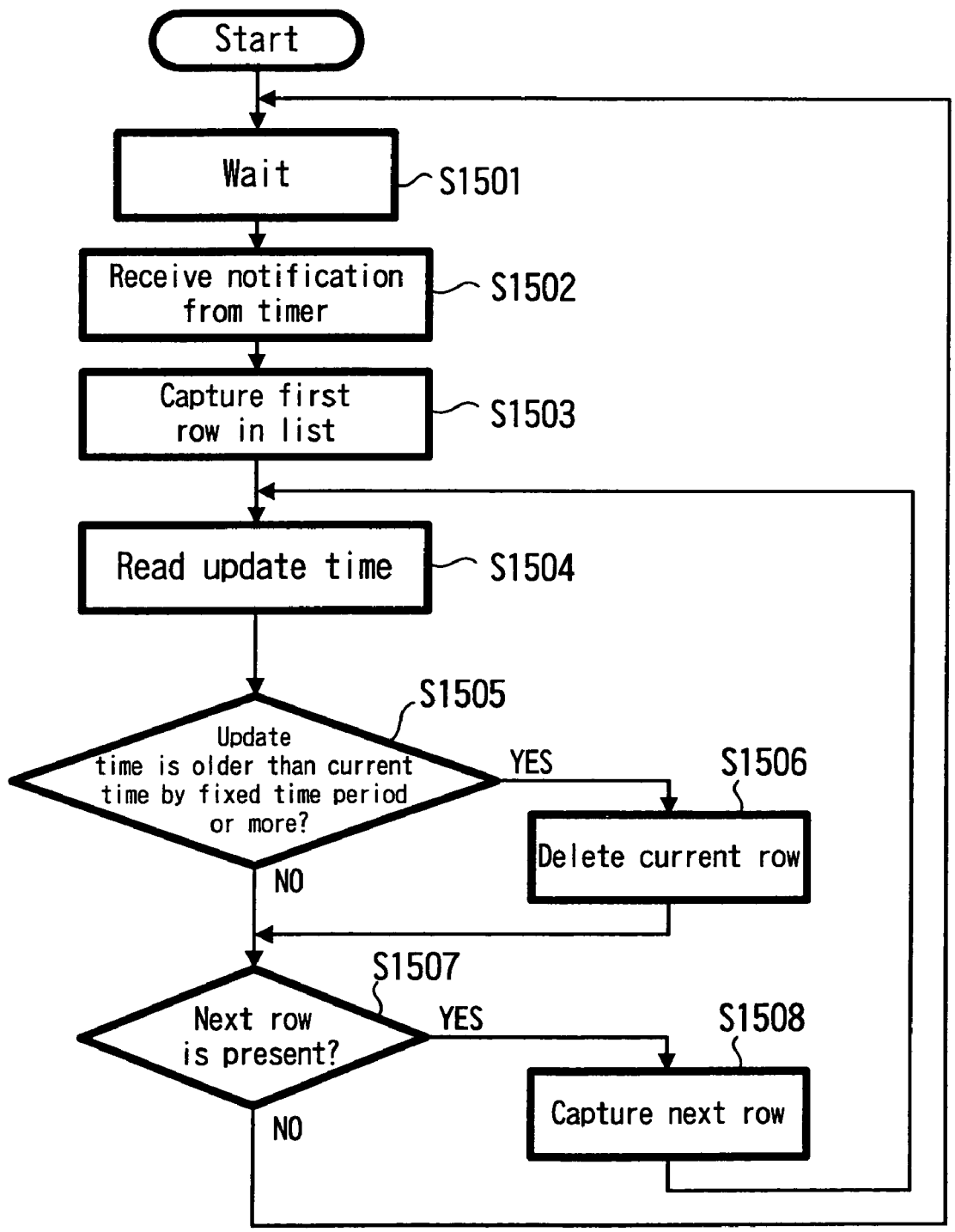
FIG. 34 is a flow chart of the processing for deleting the learned address according to the second embodiment of the invention.

A flow of the deletion will be described with reference to the flow chart of FIG. 34. The feed 101 searches all the rows in the list 124 at fixed time intervals by using a timer. First, the feed 101 waits until the feed 101 receives notification from the timer (S1501). When the time for search comes on receipt of the notification (S1502), the feed 101 extracts the first row in the list 124 (S1503) and reads the value in the column 126 having the time in the first row (S1504). Then, the feed 101 subtracts this value (time) from the current time and compares the resultant difference to a predefined time (e.g., 3 minutes) to see whether or not the difference is larger than the predefined time (S1505). When the difference is larger than the predefined time, this means that the node indicated by the address in this row in the list 124 does not send out the packet to the local network 105 for the predefined time or longer. Thus, the feed 101 deletes this row (S1506). When the difference is not larger than the predefined time, this row remains as it is. In any case, the feed 101 repeats this processing for the next row and the rows thereafter. That is, the feed 101 checks whether or not the next row is present (S1507). When the next row is present, the feed 101 reads the row (S1508). Then, the feed 101 returns to step S1504. When the next row is absent, the feed 101 again enters the wait state (step S1501).

The above is the description of the processing in which the feed 101 automatically updates the learned addresses.

Finally, the processing for the implementation and other notes will be described.

First, how the feed 101 processes a packet 136 addressed to the feed 101 itself through the local network 105 will be described. When the packet 136 flows to the feed 101 through the local network 105, this packet 136 should not be transferred to the UDL network. In step S1105 of FIG. 30, the feed 101 can detect that the destination address of the Ethernet frame of the packet 136 is the address of the feed 101 itself, and the feed 101 can capture the packet 136 therein without transferring the packet 136 to the UDL network 106. Moreover, the scheme for the implementation is as follows. The feed 101 can receive the packet addressed to the feed 101 through any interface other than the local I/F 102. For simplicity of the implementation, the feed 101 does not receive the packet 136 addressed to the feed 101 through the local I/F 102 but rejects the packet 136. In this case, an Ethernet address of the local I/F 102 of the feed 101 itself is contained in the list 124 from the start. Furthermore, the row having the Ethernet address is excluded from the rows which are to be updated when the feed 101 updates the list 124 at regular intervals. Thus, the processing moves from step S1105 of FIG. 30 to step S1106, and therefore the packet 136 is automatically rejected.

On the other hand, when the packet 136 encapsulated in the GRE packet 111 flows into the feed 101 through the tunnel I/F 104, this packet 136 should not be transferred to the local network 105 and the UDL network 106. In step S1208 of FIG. 31, the feed 101 can detect that the destination address of the Ethernet frame of the packet 136 is the address of the feed 101 itself, and the feed 101 can capture the packet 136 therein without transferring the packet 136 to any other network. Also in this case, for simplicity of the implementation, the feed 101 may be implemented in the following manner. That is, the feed 101 does not receive the packet 136 addressed to the feed 101' itself and encapsulated in GRE through the tunnel I/F 104 but rejects the packet 136. In this case, the Ethernet address of the feed 101 itself is previously contained in the list 124. Thus, the processing moves from step S1208 of FIG. 31 to step S1209, and the packet 136 is not rejected but transferred to the local network. It should be therefore noted that the useless transfer cannot be prevented only by containing the Ethernet address of the feed 101 itself in the list 124.

Next, the processing for implementing the list 124 will be described. To implement the list 124, the feed 101 has the list 124 having only a finite length due to the limits of hardware or software. Moreover, the long list 124 requires a long time for the search, thereby making it difficult to transfer a large amount of packets at high speed. Therefore, the length of the list 124 is made finite, whereby the time required for the search is reduced. Moreover, when the list 124 has the finite length, a new address cannot be added to the list 124 after all the rows in the list 124 are filled with the addresses. In this case, the address having the oldest update time among the addresses in the list 124 is deleted from the list 124 so that the new address may be added to an unoccupied row.

Figures 35, 36:
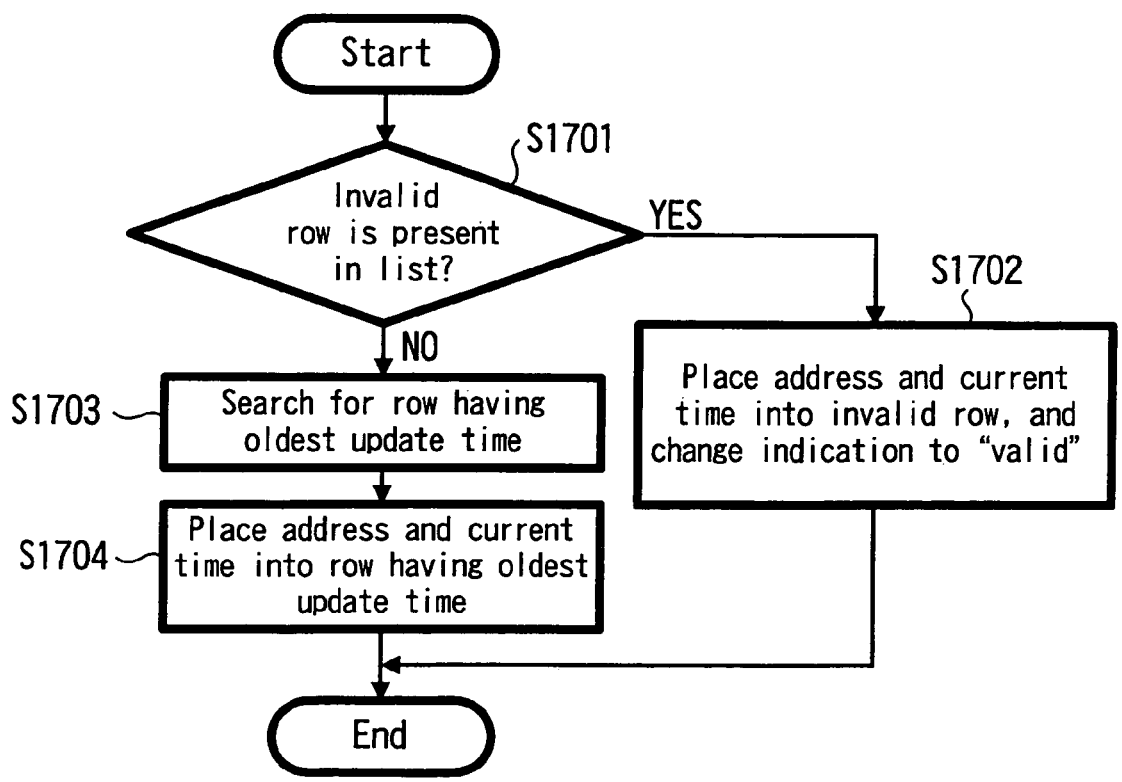
FIG. 35 illustrates the example of implementation of the list of the addresses of nodes on a local network according to the second embodiment of the invention.
FIG. 36 is a flow chart of the example of the processing for adding a new address to the list according to the second embodiment of the invention.

Specifically, as shown in FIG. 35, the feed 101 has a list 137 having such a fixed length that the time required for the search becomes insignificant. The list 137 has a column 138 indicating whether or not each row is a valid row, in addition to the column 125 for the address and the column 126 for the update time. The new address is added to the list 137 by a procedure shown in FIG. 36. First, the column 138 in the list 137 is checked to see whether or not an invalid row is present (S1701). When the invalid row is present, the new address and the update time are placed into the invalid row and an indication in the column 138 in the row is changed to "valid" (S1702). When the invalid row is absent, the column 126 in the list 137 is checked to see which row is the row having the oldest update time (S1703). Then, the new address and the update time are placed into the row having the oldest update time (S1704). This completes the addition.

To search for the address in this data structure, the feed searches the row including the valid column 138 and the column 125 having the intended address. To delete the address, the feed searches for the address to be deleted by the above-mentioned procedure and changes the indication in the column 138 in the row from "valid" to "invalid". To change the update time, the feed searches for the updated address by the above-described procedure and updates the column 126 in the row.

Figure 37:
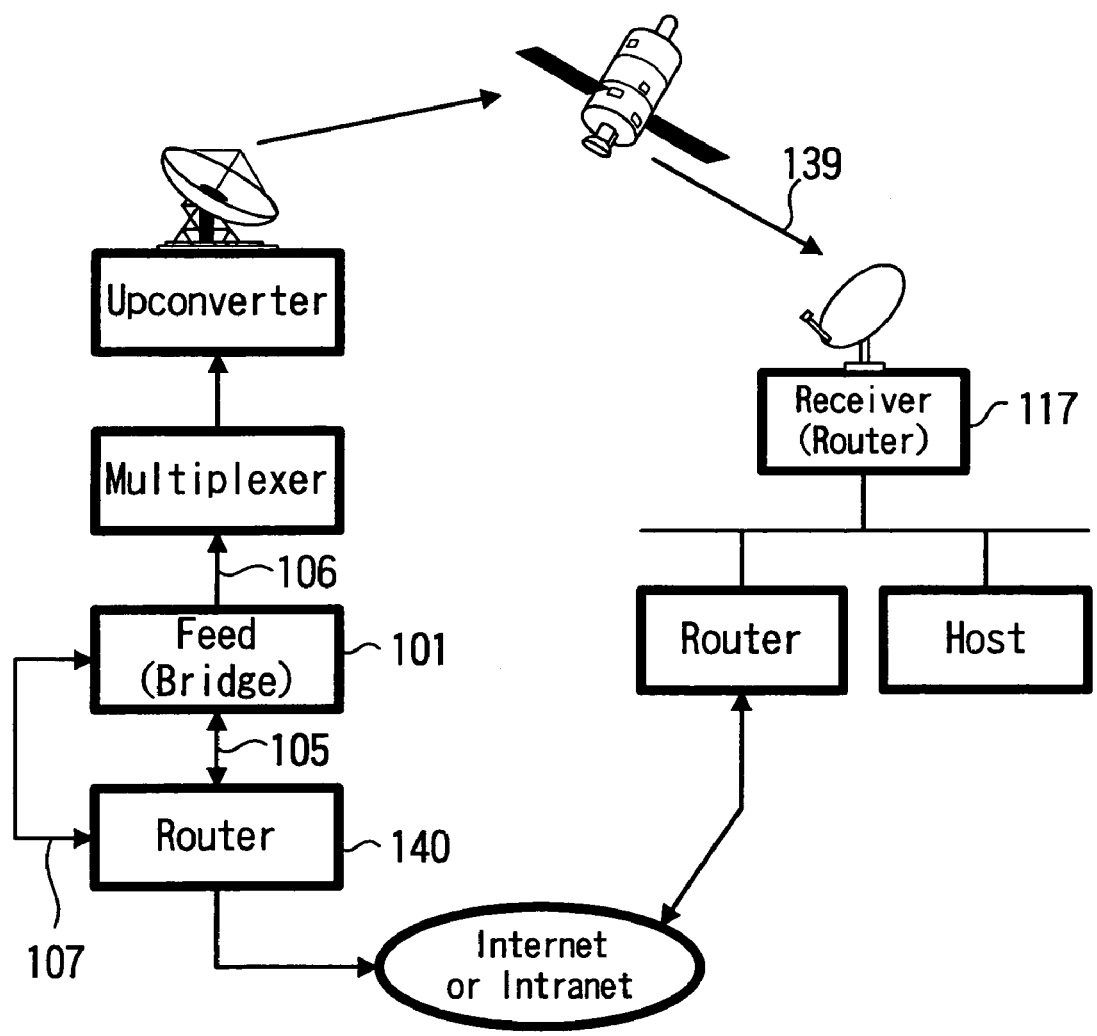
FIG. 37 is a block diagram of the example of application of the second embodiment of the invention to a system using the satellite line and the Internet (or an intranet).

The method for preventing the feed 101 from feeding the useless packet through the UDL network 106 has been described above. A specific example of the use of the feed 101 is shown in FIG. 37, for instance. A satellite line 139 may be used as the UDL network 106. The satellite line 139 has a large capacity, but it is expensive. Therefore, the prevention of feeding of the useless packet like this embodiment is an effective technique. A router 140 is one router comprising a combination of the routers 114 and 118 shown in FIG. 13. In FIG. 37, a receiver 117 is shown as the router. However, even if the receiver 117 functions as the bridge, the function of the feed 101 operates without any problem. Besides such a system, the invention effectively functions in the system in which a cable is used as the UDL network 106 or the system in which any network other than Ethernet is used as the local network 105 and the tunnel network 107.

In the above-described embodiments, the satellite line is used as the uni-directional communication line. However, the invention can be similarly applied to the system using various types of communication lines capable of uni-directional communication.

According to a first embodiment of the invention, the bridge type feed can realize the bi-directional communication as UDLR. Only by adding the bridge without changing the function of the existing router, existing routing can be therefore operated as if the uni-directional communication line were the bi-directional communication line.

Looking at the invention from a different point of view, the invention has the following advantage. Heretofore, only the router has been the communication equipment capable of realizing the bi-directional communication as UDLR. However, according to the invention, even the bridge, which is relatively easily implemented and can be inexpensively made, can realize the bi-directional communication as UDLR. Therefore, the invention can easily and inexpensively realize the bi-directional communication as UDLR, compared to the prior art.

According to a second embodiment of the invention, the bridge type feed supporting the bi-directional communication such as UDLR can reduce the number of times an unnecessary packet is transferred to the uni-directional communication line. The unnecessary packet means the packet which does not require to be transferred to the uni-directional communication line, among the packets flowing through the bi-directional communication line connected to the feed.

Thus, a band of the uni-directional communication line can be effectively used. Moreover, it is possible to reduce a load on the communication equipment such as the receiver connected to the uni-directional communication line.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication method comprising the steps of:
   connecting a second communication line capable of bi-directional communication to bridge transmitting means for transmitting data to a first uni-directional communication line, thereby virtually carrying out the bi-directional communication over said first communication line, wherein said transmitting means automatically detects addresses of nodes connected to a network at the transmitting side; and
   determining a destination of a packet inputted to said transmitting means through a predetermined interface, then determining which network the packet should be transferred to in accordance with the determined destination of the packet, and then transferring the packet through the predetermined interface only when transfer is necessary, wherein said transmitting means holds the automatically detected addressee of the nodes connected to the network at the transmitting side in the form of a list, and said transmitting means determines whether or not the packet is transferred in accordance with said list.

2. A communication method comprising the steps of:
   connecting a second communication line capable of bi-directional communication to bridge transmitting means for transmitting data to a first uni-directional communication line, thereby virtually carrying out the bi-directional communication over said first communication line, wherein said transmitting means automatically detects addresses of nodes connected to a network at the transmitting side; and
   determining a destination of a packet inputted to said transmitting means through a predetermined interface, then determining which network the packet should be transferred to in accordance with the determined destination of the packet, and then transferring the packet through the predetermined interface only when transfer is necessary,
   wherein said transmitting means holds the automatically detected addressee of the nodes connected to the network at the transmitting side in the form of a list, determines whether or not the packet is transferred in accordance with said list, regularly updates said list of the automatically detected addresses of the nodes connected to the network at the transmitting side, and wherein said transmitting means deletes from said list the address of the node which does not transmit the packet for a fixed time period or longer.

3. A communication apparatus comprising:
   a bridge transmitting means for transmitting data to a first uni-directional communication line;
   an interface connected to a second communication line capable of bi-directional communication;
   control means for determining a destination of a packet inputted through a predetermined interface, said control means includes detecting means for automatically detecting addresses of nodes connected to the network connected to the interface, then determining which network the packet is transferred to in accordance with the destination, and then executing transfer processing only when transfer is necessary; and
   address storing means for holding the node addresses automatically detected by said detecting means in the form of a list, wherein said control means determines whether or not the packet is transferred in accordance with said list stored in said address storing means.

4. A communication apparatus comprising:
   a bridge transmitting means for transmitting data to a first uni directional communication line;
   an interface connected to a second communication line capable of bi directional communication;
   control means for determining a destination of a packet inputted through a predetermined interface, said control means includes detecting means for automatically detecting addresses of nodes connected to the network connected to the interface, then determining which network the packet is transferred to in accordance with the destination, and then executing transfer processing only when transfer is necessary; and
   address storing means for holding the node addresses automatically detected by said detecting means in the form of a list, wherein said control means determines whether or not the packet is transferred in accordance with said list stored in said address storing means, wherein said control means regularly updates said list stored in said address storing means, and said control means deletes from said list the address of the node which does not transmit the packet for a fixed time period or longer.

* * * * *